US010429514B2

(12) United States Patent
Levien et al.

(10) Patent No.: US 10,429,514 B2
(45) Date of Patent: Oct. 1, 2019

(54) UNOCCUPIED FLYING VEHICLE (UFV) LOCATION ASSURANCE

(71) Applicant: Elwha LLC, Bellevue, WA (US)

(72) Inventors: Royce A. Levien, Lexington, MA (US); Robert W. Lord, Seattle, WA (US); Richard T. Lord, Federal Way, WA (US); Mark A. Malamud, Seattle, WA (US); John D. Rinaldo, Jr., Bellevue, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 15/730,629

(22) Filed: Oct. 11, 2017

(65) Prior Publication Data

US 2018/0081065 A1    Mar. 22, 2018

Related U.S. Application Data

(63) Continuation of application No. 14/042,302, filed on Sep. 30, 2013, now Pat. No. 9,810,789, which is a
(Continued)

(51) Int. Cl.
*G01S 19/21* (2010.01)
*H04L 29/06* (2006.01)
(Continued)

(52) U.S. Cl.
CPC ............ *G01S 19/21* (2013.01); *B64C 39/024* (2013.01); *G01C 21/00* (2013.01); *G01S 19/14* (2013.01);
(Continued)

(58) Field of Classification Search
CPC ............ B64C 39/024; B64C 2201/143; B64C 2201/146; B64C 2201/141; G08G 5/0069; G08G 5/0091; G08G 1/0027
See application file for complete search history.

(56) References Cited

U.S. PATENT DOCUMENTS

| 4,964,837 A | 10/1990 | Collier |
| 5,581,250 A | 12/1996 | Khvilivitzky |

(Continued)

FOREIGN PATENT DOCUMENTS

WO    WO-2009093276 A1 *   7/2009    ............. G01C 11/00

OTHER PUBLICATIONS

Zarzhitsky, Dimitri V.; "Physic-Based Approach to Chemical Source Localization Using Mobile Robotic Swarms"; a dissertation submitted to the Department of Computer Science and The Graduate School of the University of Wyoming; bearing a date of Aug. 2008; pp. 1-299; ProQuest LLC, UMI Microform 3338814; Ann Arbor, Michigan.
(Continued)

*Primary Examiner* — Anne M Antonucci

(57) ABSTRACT

Disclosed herein are example embodiments for unoccupied flying vehicle (UFV) location assurance. For certain example embodiments, at least one machine, such as a UFV, may: (i) obtain one or more satellite positioning system (SPS) coordinates corresponding to at least an apparent location of at least one UFV; or (ii) perform at least one analysis that uses at least one or more SPS coordinates and at least one assurance token. However, claimed subject matter is not limited to any particular described embodiments, implementations, examples, or so forth.

20 Claims, 22 Drawing Sheets

Related U.S. Application Data continuation-in-part of application No. 14/015,669, filed on Aug. 30, 2013, now Pat. No. 9,669,926, which is a continuation-in-part of application No. 13/866,743, filed on Apr. 19, 2013, now Pat. No. 9,527,587, which is a continuation-in-part of application No. 13/800,391, filed on Mar. 13, 2013, now Pat. No. 9,540,102, which is a continuation-in-part of application No. 13/731,721, filed on Dec. 31, 2012, now Pat. No. 9,405,296, which is a continuation-in-part of application No. 13/731,450, filed on Dec. 31, 2012, now Pat. No. 9,235,218, which is a continuation-in-part of application No. 13/731,407, filed on Dec. 31, 2012, now Pat. No. 9,747,809, which is a continuation-in-part of application No. 13/731,363, filed on Dec. 31, 2012, which is a continuation-in-part of application No. 13/730,202, filed on Dec. 28, 2012, now Pat. No. 9,567,074, which is a continuation-in-part of application No. 13/728,642, filed on Dec. 27, 2012, now Pat. No. 9,527,586.

(51) Int. Cl.

| | |
|---|---|
| *G08G 5/00* | (2006.01) |
| *B64C 39/02* | (2006.01) |
| *G01C 21/00* | (2006.01) |
| *G01S 19/14* | (2010.01) |
| *G01S 19/39* | (2010.01) |
| *G01D 1/10* | (2006.01) |
| *B64C 33/00* | (2006.01) |
| *F41H 11/02* | (2006.01) |
| *G05D 1/10* | (2006.01) |

(52) U.S. Cl.
CPC .......... *G01S 19/215* (2013.01); *G01S 19/39* (2013.01); *G05D 1/101* (2013.01); *G08G 5/0008* (2013.01); *G08G 5/0013* (2013.01); *G08G 5/0052* (2013.01); *G08G 5/0069* (2013.01); *G08G 5/0078* (2013.01); *G08G 5/0086* (2013.01); *G08G 5/0091* (2013.01); *H04L 63/14* (2013.01); *B64C 33/00* (2013.01); *B64C 2201/101* (2013.01); *B64C 2201/102* (2013.01); *B64C 2201/104* (2013.01); *B64C 2201/108* (2013.01); *B64C 2201/143* (2013.01); *B64C 2201/145* (2013.01); *B64C 2201/146* (2013.01); *F41H 11/02* (2013.01)

(56) References Cited

U.S. PATENT DOCUMENTS

| | | | |
|---|---|---|---|
| 6,694,228 B2 | 2/2004 | Rios | |
| 6,786,213 B1 | 9/2004 | Lee | |
| 6,804,607 B1 | 10/2004 | Wood | |
| 6,896,220 B2 | 5/2005 | McKendree et al. | |
| 6,926,233 B1 | 8/2005 | Corcoran, III | |
| 6,952,001 B2 | 10/2005 | McKendree et al. | |
| 6,980,151 B1 | 12/2005 | Mohan | |
| 7,024,309 B2 | 4/2006 | Doane | |
| 7,039,367 B1 | 5/2006 | Kucik | |
| 7,299,130 B2 | 11/2007 | Mulligan et al. | |
| 7,437,225 B1 | 10/2008 | Rathinam | |
| 7,542,828 B2 | 6/2009 | Steele et al. | |
| 7,737,878 B2 | 1/2010 | van Tooren et al. | |
| 7,693,624 B2 | 4/2010 | Duggan et al. | |
| 7,747,364 B2 | 6/2010 | Roy et al. | |
| 7,876,258 B2 | 1/2011 | Abraham et al. | |
| 7,953,524 B1 | 5/2011 | Roggendorf | |
| 7,969,346 B2 | 6/2011 | Franceschini et al. | |
| 7,970,506 B2 | 6/2011 | DeMarco et al. | |
| 8,060,270 B2 | 11/2011 | Vian et al. | |
| 8,068,949 B2 | 11/2011 | Duggan et al. | |
| 8,086,351 B2 | 12/2011 | Gaudiano et al. | |
| 8,103,398 B2 | 1/2012 | Duggan et al. | |
| 8,380,367 B2 | 2/2013 | Schultz et al. | |
| 8,471,186 B2 | 6/2013 | Wallis | |
| 8,700,306 B2 | 4/2014 | Duggan et al. | |
| 2001/0044444 A1 | 11/2001 | Mahe et al. | |
| 2003/0014165 A1 | 1/2003 | Baker et al. | |
| 2003/0135762 A1 | 7/2003 | Macaulay | |
| 2004/0193334 A1 | 9/2004 | Carlsson et al. | |
| 2004/0249519 A1 | 12/2004 | Frink | |
| 2005/0004723 A1 | 1/2005 | Duggan et al. | |
| 2005/0077424 A1 | 4/2005 | Schneider | |
| 2005/0090945 A1 | 4/2005 | Bodin et al. | |
| 2005/0136891 A1 | 6/2005 | Wang et al. | |
| 2005/0197749 A1 | 9/2005 | Nichols et al. | |
| 2006/0058928 A1 | 3/2006 | Beard et al. | |
| 2006/0058931 A1 | 3/2006 | Ariyur et al. | |
| 2006/0089766 A1 | 4/2006 | Allard et al. | |
| 2006/0097895 A1 | 5/2006 | Reynolds et al. | |
| 2006/0167596 A1 | 7/2006 | Bodin et al. | |
| 2006/0238414 A1 | 10/2006 | Miyamoto et al. | |
| 2006/0249622 A1 | 11/2006 | Steele | |
| 2006/0271248 A1 | 11/2006 | Cosgrove et al. | |
| 2006/0287824 A1 | 12/2006 | Lin | |
| 2007/0021879 A1 | 1/2007 | DelNero et al. | |
| 2007/0106473 A1 | 5/2007 | Bodin et al. | |
| 2007/0139252 A1 | 6/2007 | Barry et al. | |
| 2007/0152814 A1 | 7/2007 | Stefani | |
| 2007/0168090 A1 | 7/2007 | DeMarco et al. | |
| 2007/0210953 A1 | 9/2007 | Abraham et al. | |
| 2008/0033604 A1 | 2/2008 | Margolin | |
| 2008/0055149 A1 | 3/2008 | Rees et al. | |
| 2008/0125933 A1 | 5/2008 | Williams et al. | |
| 2008/0190274 A1 | 8/2008 | Kirkpatrick | |
| 2008/0249669 A1 | 10/2008 | Skarman | |
| 2008/0255711 A1 | 10/2008 | Matos | |
| 2009/0027253 A1 | 1/2009 | Van Tooren et al. | |
| 2009/0102630 A1 | 4/2009 | Nordlund et al. | |
| 2009/0118896 A1 | 5/2009 | Gustafsson | |
| 2009/0125221 A1 | 5/2009 | Estkowski et al. | |
| 2009/0134981 A1 | 5/2009 | Shafaat et al. | |
| 2009/0210109 A1 | 8/2009 | Ravenscroft | |
| 2009/0212157 A1 | 8/2009 | Arlton et al. | |
| 2009/0222148 A1 | 9/2009 | Knotts et al. | |
| 2009/0318138 A1 | 12/2009 | Zeng et al. | |
| 2009/0319100 A1 | 12/2009 | Kale et al. | |
| 2010/0004798 A1 | 1/2010 | Bodin et al. | |
| 2010/0049376 A1 | 2/2010 | Schultz | |
| 2010/0084513 A1 | 4/2010 | Gariepy et al. | |
| 2010/0094481 A1 | 4/2010 | Anderson | |
| 2010/0094499 A1 | 4/2010 | Anderson | |
| 2010/0094981 A1 | 4/2010 | Cordray et al. | |
| 2010/0100269 A1 | 4/2010 | Ekhaguere et al. | |
| 2010/0121574 A1 | 5/2010 | Ariyur et al. | |
| 2010/0127923 A1 | 5/2010 | Harper | |
| 2010/0131121 A1 | 5/2010 | Gerlock | |
| 2010/0163621 A1 | 7/2010 | Ben-Asher et al. | |
| 2010/0198514 A1 | 8/2010 | Miralles | |
| 2010/0204867 A1 | 8/2010 | Longstaff | |
| 2010/0224732 A1 | 9/2010 | Olson et al. | |
| 2010/0250022 A1 | 9/2010 | Hines et al. | |
| 2010/0292871 A1 | 11/2010 | Schultz et al. | |
| 2010/0292874 A1 | 11/2010 | Duggan et al. | |
| 2010/0302359 A1 | 12/2010 | Adams et al. | |
| 2010/0332136 A1 | 12/2010 | Duggan et al. | |
| 2011/0035149 A1 | 2/2011 | McAndrew et al. | |
| 2011/0118907 A1 | 5/2011 | Elkins | |
| 2011/0118981 A1 | 5/2011 | Chamlou | |
| 2011/0134249 A1 | 6/2011 | Wood et al. | |
| 2011/0169943 A1 | 7/2011 | Bachman, II et al. | |
| 2011/0307204 A1* | 12/2011 | Cho | B60T 8/172 702/96 |
| 2012/0016534 A1 | 1/2012 | Lee et al. | |
| 2012/0022719 A1 | 1/2012 | Matos | |
| 2012/0083947 A1 | 4/2012 | Anderson et al. | |
| 2012/0089274 A1 | 4/2012 | Lee et al. | |
| 2012/0092208 A1 | 4/2012 | LeMire et al. | |
| 2012/0106800 A1 | 5/2012 | Khan et al. | |

(56) References Cited

U.S. PATENT DOCUMENTS

| | | | |
|---|---|---|---|
| 2012/0123628 A1 | 5/2012 | Duggan et al. |
| 2012/0143482 A1 | 6/2012 | Gossen et al. |
| 2012/0167207 A1 | 6/2012 | Beckley et al. |
| 2012/0187243 A1 | 7/2012 | Goldie et al. |
| 2012/0200404 A1 | 8/2012 | Morris |
| 2012/0210853 A1 | 8/2012 | Abershitz et al. |
| 2012/0221168 A1 | 8/2012 | Zeng et al. |
| 2012/0296497 A1 | 11/2012 | Lee et al. |
| 2012/0306663 A1 | 12/2012 | Mudalige |
| 2013/0131976 A1 | 5/2013 | Hubbard |
| 2013/0197734 A1 | 8/2013 | Okura |
| 2013/0197739 A1 | 8/2013 | Gallagher et al. |
| 2013/0211656 A1 | 8/2013 | An et al. |
| 2014/0142787 A1 | 5/2014 | Tillotson et al. |
| 2014/0156109 A1 | 6/2014 | Estkowski |

OTHER PUBLICATIONS

"A Swarm of Nano Quadrotors", YouTube.com, http://www.youtube.com/watch?v=YQIMGV5vtd4, Jan. 31, 2012.

"Collision Avoidance—Where We Are: Detect See and Avoid versus See and Avoid", UAV MarketSpace Developing Commercial UAV Applications, http://www.uavm.com/uavregulatory/collisionavoidance.html, Dec. 5, 2012, pp. 1-5.

"Drone Hijacking? That's Just the Start of GPS Troubles", Danger Room Wired.com, http://www.wired.com/dangerroom/2012/07/drone-hijacking/all/, Jan. 11, 2013, pp. 1-4.

"Most U.S. Drones Openly Broadcast Secret Video Feeds", Danger Room Wired.com, http://www.wired.com/dangerroom/2012/10/hack-proof-drone, Jan. 11, 2013, pp. 1-4.

"Pentagon Looks to Fix 'Pervasive Vulnerability' in Drones", Danger Room Wired.com, http://www.wired.com/dangerroom/212/12/darpa-drones/, Jan. 11, 2013, pp. 1-5.

"Robot Quadrotors Perform James Bond Theme", YouTube.com, http://www.youtube.com/watch?vs=sUeGc-8dyk, Feb. 28, 2012.

"Unmanned aerial vehicle", Wikipedia, http://en.wikipedia.org/wiki/Unmanned.sub.-aerial.sub.--vehicle, Dec. 3, 2012, pp. 1-21.

"Vijay Kumar: Robots that fly . . . and cooperate", TED.com; http://www.ted.com/talks/vjay.sub.--kumar.sub.--robots.sub.--that.sub.--f-ly.sub.--and.sub.--cooperate.htm, Mar. 2012.

Albaker; Rahim; "Autonomous unmanned aircraft collision avoidance system based on geometric intersection", International Journal of the Physical Sciences, Feb. 4, 2011, vol. 6, pp. 391-401.

Anderson, Chris; "How I Accidentally Kickstarted the Domestric Drone Boom", Danger Room Wired.com, http://www.wired.com/dangerroom/2012/06/ff.sub.--drones/all/, Dec. 6, 2012, pp. 1-10.

Bai; Hsu; Kochenderfer; Lee; "Unmanned Aircraft Collision Avoidance using Continuous-State POMDPs", National University of Singapore School of Computing;, https://www1.comp.nus.edu.sg/.about.leews/publications/rss11.pdf, Dec. 3, 2012.

Dean, Stephen; "Drone crashes into SWAT team tank during police test near Houston", Examiner.com, http://www.examiner.com/page-one-in-houston/drone-crashes-into-swat-team--tank-during-police-test-near-houston, Mar. 20, 2012, pp. 1-4.

Federal Aviation Administration; DOT Regs 14-CFR-91 Subchapter-F Subpart-B Flight Rules; Dec. 15, 2013 pp. 711-738.

Geyer; Singh; Chamerlain; "Avoiding Collisions Between Aircraft: State of the Art and Requirements for UAVs operating in Civilian Airspace", Robotics Institute, Carnegie Mellon University, Jan. 2008, pp. 1-19 Pittsburgh, Pennsylvania.

Gruen, Armin; "First Civilian Photogrammetric UAV Flight Over Singapore", Sensors & Systems, http://sensorsandsystems.com/article/features/26474-first-civiliarn-photo-grammetric-uav-flig, Mar. 26, 2012; pp. 1-7.

Leopold, George; "U.S. To begin testing future drones", EE Times, http://www.eetimes.com/General/PrintView/4237809, Mar. 9, 2012, pp. 1.

Montgomery; Johnson; Roumeliotis; Matthies; "The JPL Autonomous Helicopter Testbed: A Platform for Planetary Exploration Technology Research and Development", Journal of Field Robotics, vol. 23(3), Dec. 3, 2012, Wiley Periodicals, Inc.

Subbaraman, Nidhi; "Drones over America: How unmanned fliers are already helping cops", NBC News.com, http://www.nbcnews.com/technology/drones-over-america-how-unmanned-fliers--are-already-helping-cops-1C9135554, Mar. 30, 201, pp. 1-5.

\* cited by examiner

UNOCCUPIED FLYING VEHICLE (UFV) 102

REMOTE UFV 102R

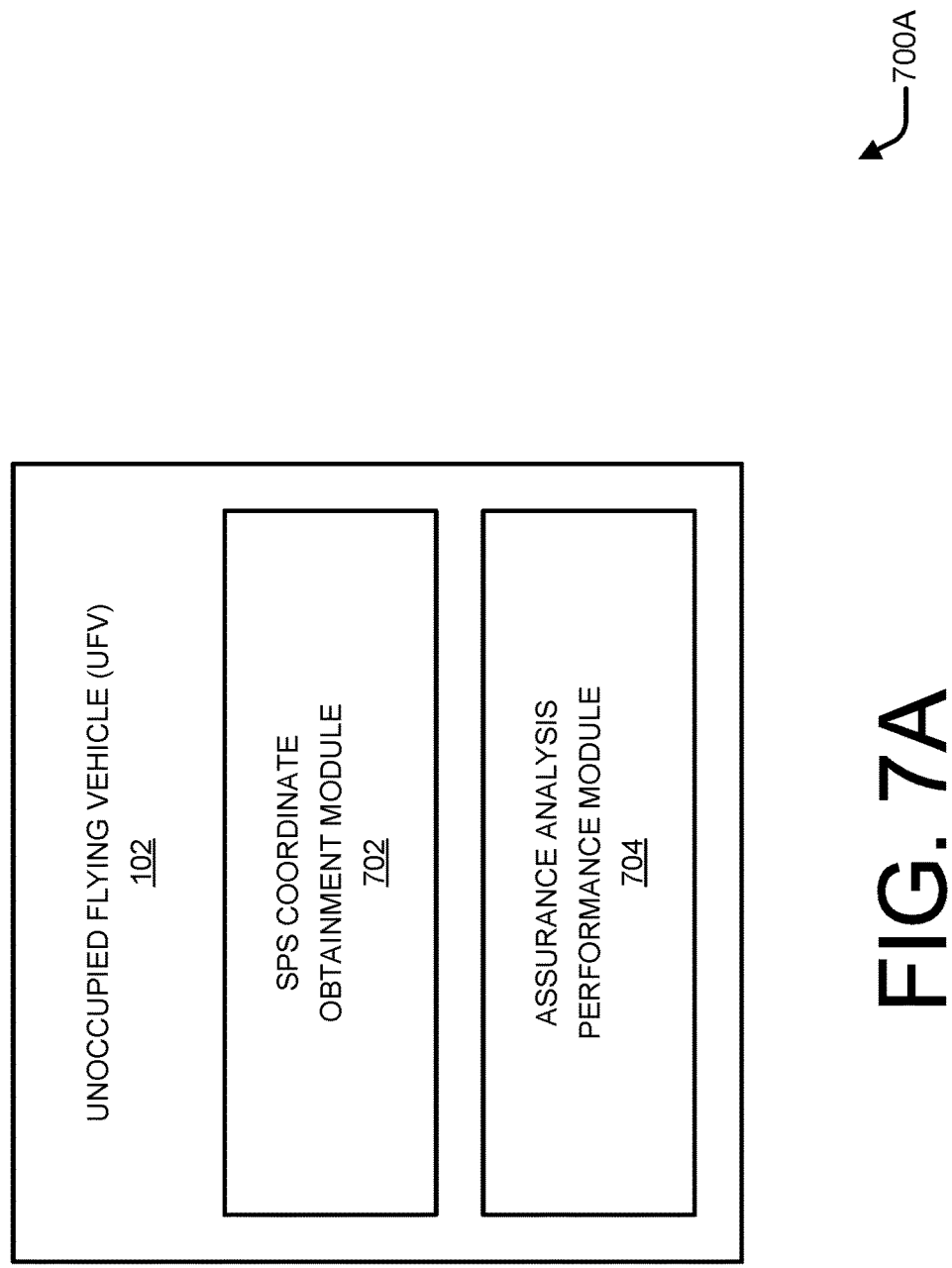

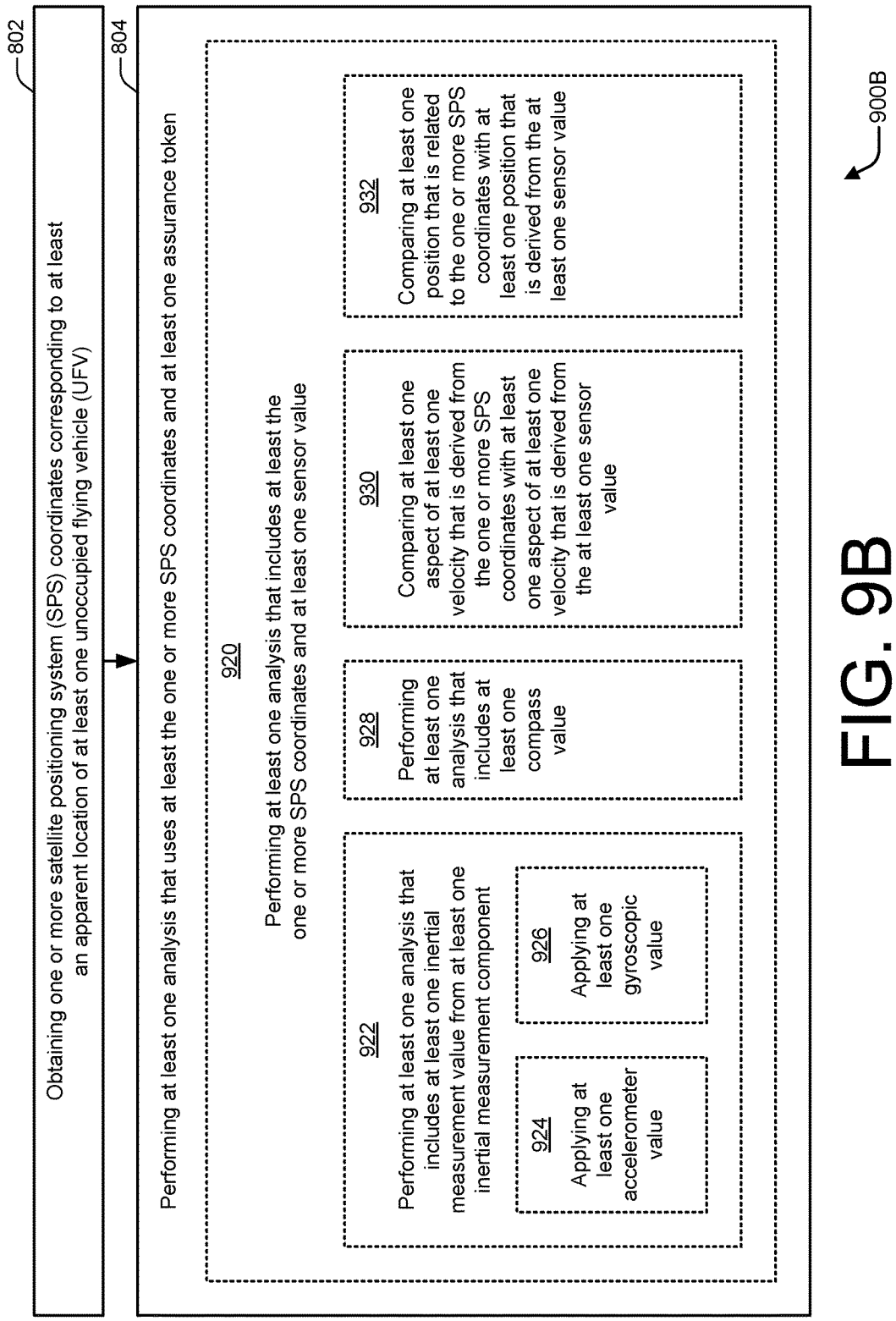

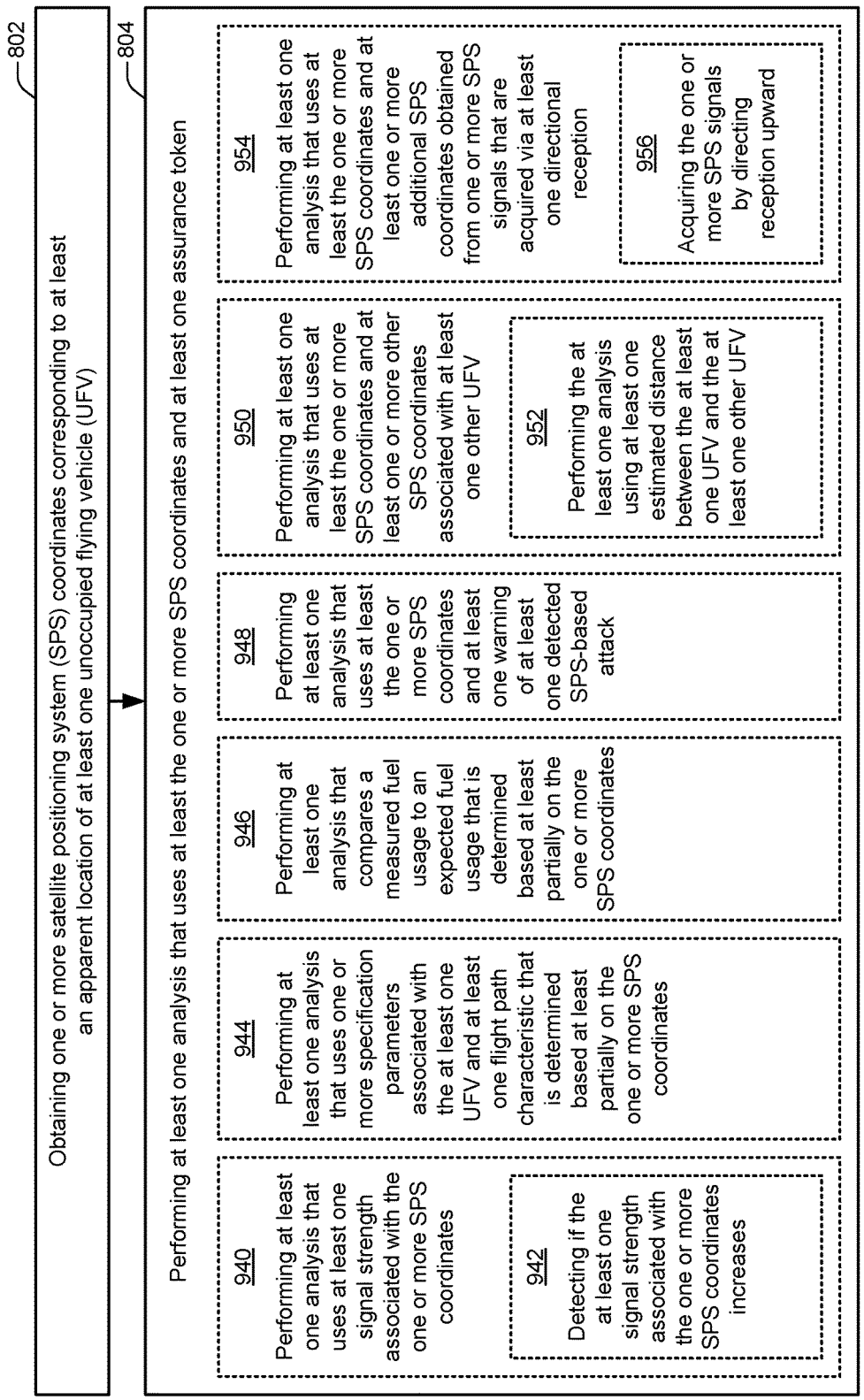

UNOCCUPIED FLYING VEHICLE (UFV) LOCATION ASSURANCE

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS (1) For purposes of the USPTO extra-statutory requirements, the present application constitutes a continuation-in-part of U.S. patent application Ser. No. 13/720, 694, entitled "Inter-Vehicle Communication for Hazard Handling for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 19 Dec. 2012, which is currently co-pending or is an application of which a currently co-pending application is entitled to the benefit of the filing date.

(2) For purposes of the USPTO extra-statutory requirements, the present application constitutes a continuation-in-part of U.S. patent application Ser. No. 13/722, 874, entitled "Unoccupied Flying Vehicle (UFV) Inter-Vehicle Communication for Hazard Handling", naming Royce A. Levien, Richard T. Lord, Robert W. Lord, Mark A. Malamud, John D. Rinaldo, Jr., and Lowell L. Wood, Jr. as inventors, filed 20 Dec. 2012, which is currently co-pending or is an application of which a currently co-pending application is entitled to the benefit of the filing date.

(3) For purposes of the USPTO extra-statutory requirements, the present application constitutes a continuation-in-part of U.S. patent application Ser. No. 13/728, 642, entitled "Inter-Vehicle Flight Attribute Communication for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 27 Dec. 2012, which is currently co-pending or is an application of which a currently co-pending application is entitled to the benefit of the filing date.

(4) For purposes of the USPTO extra-statutory requirements, the present application constitutes a continuation-in-part of U.S. patent application Ser. No. 13/730, 202, entitled "Base Station Control for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 28 Dec. 2012, which is currently co-pending or is an application of which a currently co-pending application is entitled to the benefit of the filing date.

(5) For purposes of the USPTO extra-statutory requirements, the present application constitutes a continuation-in-part of U.S. patent application Ser. No. 13/731, 363, entitled "Automated Hazard Handling Routine Engagement", naming Royce A. Levien, Richard T. Lord, Robert W. Lord, Mark A. Malamud, John D. Rinaldo, Jr., and Lowell L. Wood, Jr. as inventors, filed 31 Dec. 2012, which is currently co-pending or is an application of which a currently co-pending application is entitled to the benefit of the filing date.

(6) For purposes of the USPTO extra-statutory requirements, the present application constitutes a continuation-in-part of U.S. patent application Ser. No. 13/731, 407, entitled "Automated Hazard Handling Routine Activation", naming Royce A. Levien, Richard T. Lord, Robert W. Lord, Mark A. Malamud, John D. Rinaldo, Jr., and Lowell L. Wood, Jr. as inventors, filed 31 Dec. 2012, which is currently co-pending or is an application of which a currently co-pending application is entitled to the benefit of the filing date.

(7) For purposes of the USPTO extra-statutory requirements, the present application constitutes a continuation-in-part of U.S. patent application Ser. No. 13/731, 450, entitled "Collision Targeting for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 31 Dec. 2012, which is currently co-pending or is an application of which a currently co-pending application is entitled to the benefit of the filing date.

(8) For purposes of the USPTO extra-statutory requirements, the present application constitutes a continuation-in-part of U.S. patent application Ser. No. 13/731, 721, entitled "Collision Targeting for Hazard Handling", naming Royce A. Levien, Richard T. Lord, Robert W. Lord, Mark A. Malamud, John D. Rinaldo, Jr., and Lowell L. Wood, Jr. as inventors, filed 31 Dec. 2012, which is currently co-pending or is an application of which a currently co-pending application is entitled to the benefit of the filing date.

(9) For purposes of the USPTO extra-statutory requirements, the present application constitutes a continuation-in-part of U.S. patent application Ser. No. 13/800, 391, entitled "Base Station Multi-Vehicle Coordination", naming Royce A. Levien, Richard T. Lord, Robert W. Lord, Mark A. Malamud, John D. Rinaldo, Jr., and Lowell L. Wood, Jr. as inventors, filed 13 Mar. 2013, which is currently co-pending or is an application of which a currently co-pending application is entitled to the benefit of the filing date.

(10) For purposes of the USPTO extra-statutory requirements, the present application constitutes a continuation-in-part of U.S. patent application Ser. No. 13/866, 743, entitled "Unoccupied Flying Vehicle (UFV) Coordination", naming Royce A. Levien, Richard T. Lord, Robert W. Lord, Mark A. Malamud, John D. Rinaldo, Jr., and Lowell L. Wood, Jr. as inventors, filed 19 Apr. 2013, which is currently co-pending or is an application of which a currently co-pending application is entitled to the benefit of the filing date.

(11) For purposes of the USPTO extra-statutory requirements, the present application constitutes a continuation-in-part of U.S. patent application Ser. No. 14/015, 669, entitled "Unoccupied Flying Vehicle (UFV) Location Confirmance", naming Royce A. Levien, Richard T. Lord, Robert W. Lord, Mark A. Malamud, John D. Rinaldo, Jr., and Lowell L. Wood, Jr. as inventors, filed 30 Aug. 2013, which is currently co-pending or is an application of which a currently co-pending application is entitled to the benefit of the filing date.

(12) For purposes of the USPTO extra-statutory requirements, the present application constitutes a continuation of U.S. patent application Ser. No. 14/042,302, entitled "Unoccupied Flying Vehicle (UFV) Location Assurance", naming Royce A. Levien, Richard T. Lord, Robert W. Lord, Mark A. Malamud, John D. Rinaldo, Jr., and Lowell L. Wood, Jr. as inventors, filed 30 Sep. 2013, which is currently co-pending or is an application of which a currently co-pending application is entitled to the benefit of the filing date.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

BRIEF DESCRIPTION OF THE FIGURES

FIG. 1 is a schematic diagram of at least one unoccupied flying vehicle (UFV) in accordance with certain example embodiments.

FIG. 7A is a schematic diagram that includes at least one example machine, such as an unoccupied flying vehicle (UFV), that is capable of handling scenarios for UFV location assurance in accordance with certain example embodiments.

FIGS. 9A-9C depict example additions or alternatives for a flow diagram of FIG. 8A in accordance with certain example embodiments.

DETAILED DESCRIPTION

Figure 2:
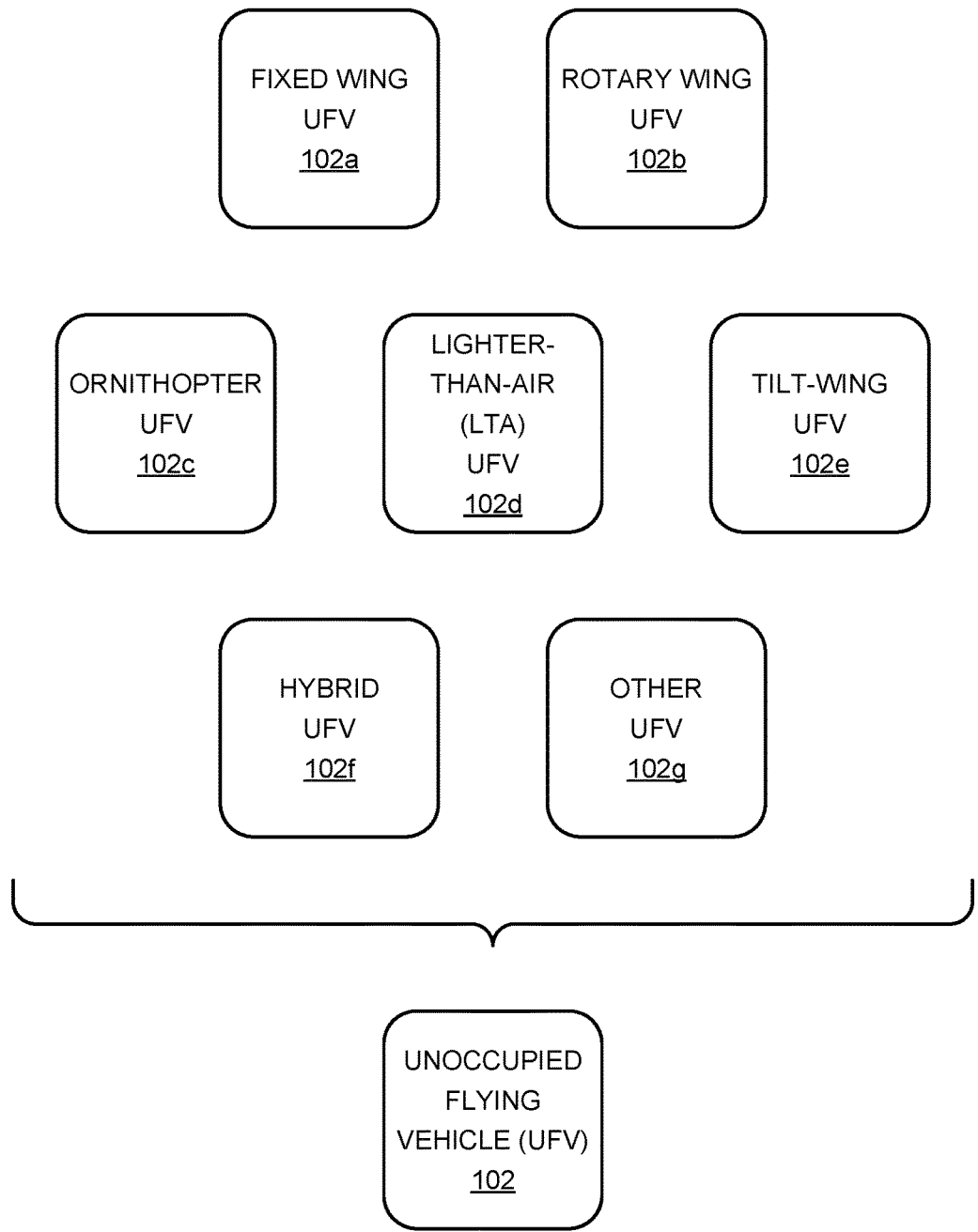
FIG. 2 is a schematic diagram of example realizations for at least one UFV in accordance with certain example embodiments.

In the following detailed description, reference is made to the accompanying drawings, which form a part hereof. In the drawings, symbols that are the same or at least similar typically identify similar, analogous, or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a schematic diagram 100 of at least one unoccupied flying vehicle (UFV) in accordance with certain example embodiments. As shown in FIG. 1, by way of example but not limitation, schematic diagram 100 may include at least one unoccupied flying vehicle (UFV) 102 or at least one remote UFV 102R. For certain example implementations, any particular UFV: may be, comprise, or include a UFV 102, such as a local UFV, or may be, comprise, or include a remote UFV 102R. A given UFV scenario may be considered, analyzed, operated, viewed, or a combination thereof, etc. from a perspective of at least one local UFV 102 with regard to one or more remote UFVs 102R. Disclosure herein or in the accompany drawings, which form a part hereof, that is directed to a UFV 102 may additionally or alternatively be applicable to a remote UFV 102R, unless context dictates otherwise. However, claimed subject matter is not limited to any particular described embodiments, implementations, examples, etc.

For certain example embodiments, a UFV 102 may comprise or include a vehicle that is not capable of being occupied by a human pilot (e.g., due to size, shape, power, atmospheric pressure, or a combination thereof, etc. constraints), a vehicle that is not designed to seat or otherwise safely support a person, a vehicle that is not controllable by an onboard human pilot, a vehicle that is being autonomously controlled at least partially by at least one onboard module, a vehicle that is being autonomously controlled at least partially by at least one off-board module, a combination thereof, or so forth. For certain example embodiments, a UFV 102 may be at least comparable to or may comprise or include at least a portion of any one or more of: an unmanned aerial vehicle (UAV), a remotely piloted vehicle (RPV), an unmanned combat air vehicle (UCAV), an unmanned aircraft (UA), a drone, an optionally-piloted vehicle (OPV) that is not currently being controlled by an on-board pilot, a remotely piloted aircraft (RPA), a remotely operated aircraft (ROA), a radio-controlled aircraft (R/C aircraft), an automated flying drone (AFD) (e.g., a drone that is locally or remotely controlled by a computer or other processing device), an unmanned-aircraft vehicle system (UAVS), an unmanned aircraft system (UAS), a small unmanned air system (sUAS), a single one of any of the above, a combination of any two or more of the above, or so forth. For certain example embodiments, a UFV 102 may fly through a fluid (e.g., the earth's atmosphere or the air), through at least a partial vacuum (e.g., space or near-earth orbit), a combination thereof, or so forth. However, claimed subject matter is not limited to any particular described embodiments, implementations, examples, etc.

FIG. 2 is a schematic diagram 200 of example realizations for at least one UFV in accordance with certain example embodiments. As shown in FIG. 2, by way of example but not limitation, schematic diagram 200 may include at least one unoccupied flying vehicle (UFV) 102, at least one fixed wing UFV 102a, at least one rotary wing UFV 102b, at least one ornithopter UFV 102c, at least one lighter-than-air (LTA) UFV 102d, at least one tilt-wing UFV 102e, at least one hybrid UFV 102f, or at least one other type of UFV 102g. However, claimed subject matter is not limited to any particular described embodiments, implementations, examples, etc.

For certain example embodiments, a UFV 102 may be realized as described by any one or more of the examples in this paragraph. First, a UFV 102 may be realized as a fixed wing UFV 102a, such as a propeller-driven biplane or a jet plane. Second, a UFV 102 may be realized as a rotary wing UFV 102b, such as a helicopter or a gyrodyne. Third, a UFV 102 may be realized as an ornithopter UFV 102c, such as small craft that has flapping wings like an animal (e.g., like a dragonfly, bee, bird, or bat, etc.). Fourth, a UFV 102 may be realized as an LTA UFV 102d, such as a blimp, a balloon, or a dirigible. Fifth, a UFV 102 may be realized as a tilt-wing UFV 102e, such as a propeller-driven airplane with wings that rotate at least one during vertical takeoff or landing. Sixth, a UFV 102 may be realized as a hybrid UFV 102f that combines one or more capabilities or structural characteristics of at least one fixed wing UFV 102a, at least one rotary wing UFV 102b, at least one ornithopter UFV 102c, at least one LTA UFV 102d, at least one tilt-wing UFV 102e, or at least one other UFV 102g. Seventh, a UFV 102 may be realized as an other type of UFV 102g, such as a tilt-rotor craft, a submarine, a rocket, a spaceship, a satellite, a vertical take-off and landing (VTOL) craft, a combination thereof, or so forth. However, claimed subject matter is not limited to any particular described embodiments, implementations, examples, etc.

For certain example embodiments, a UFV 102 may additionally or alternatively be realized so as to have one or more features, capabilities, structural characteristics, or a combination thereof, etc. as described by any one or more of the examples in this paragraph. First, a UFV 102 may include one rotor, two rotors (e.g., in a tandem, transverse, coaxial, or intermeshing, etc. configuration), three rotors, four rotors (e.g., a quadcopter, or a quadrotor, etc.), a combination thereof, or so forth. Second, a UFV 102 may include a propeller engine, a jet engine, an electric engine, a rocket engine, a ramjet or scramjet engine, a combination thereof, or so forth. Third, a UFV 102 may have at least one wing (e.g., a monoplane, a biplane, or a triplane, etc. in a stacked or tandem wing configuration), which may include a straight wing, a swept wing, a delta wing, a variable sweep wing, a combination thereof, or so forth. Fourth, a UFV 102 may be realized as having a fuselage, as having a flying wing structure, as having a blended-wing body, a combination thereof, or so forth. However, claimed subject matter is not limited to any particular described embodiments, implementations, examples, etc.

Figure 3A:
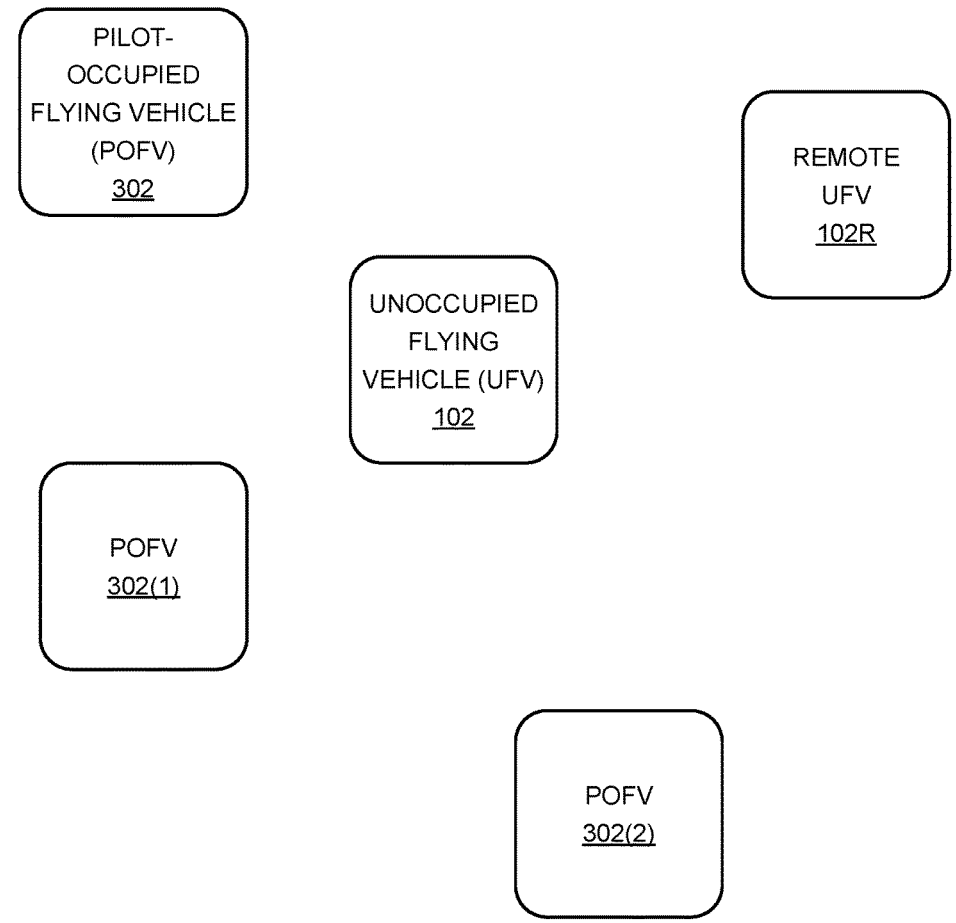
FIGS. 3A-3C are schematic diagrams of example UFV hazard handling scenarios or environments in accordance with certain example embodiments.
Figure 3B:
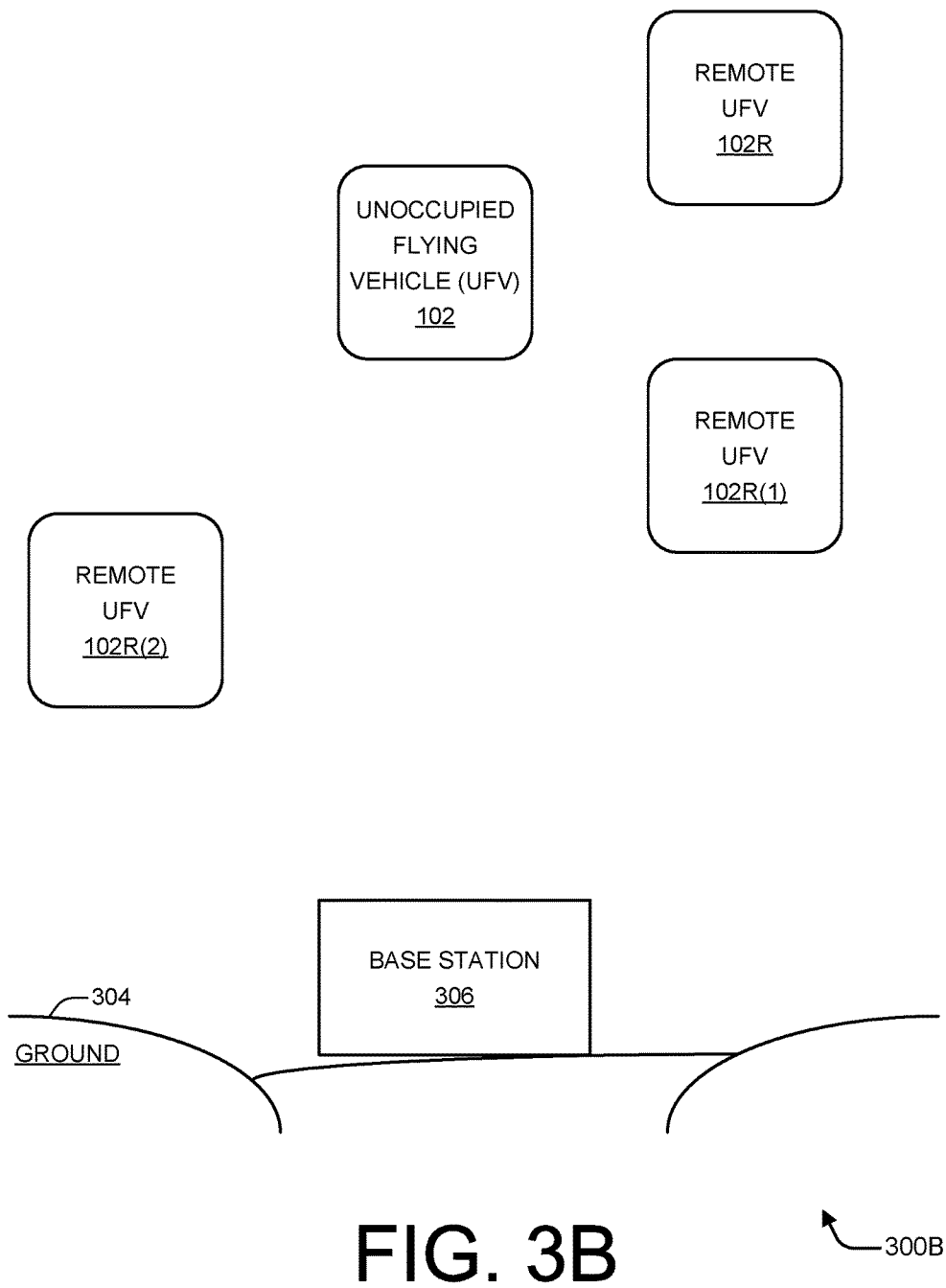
Figure 3C:
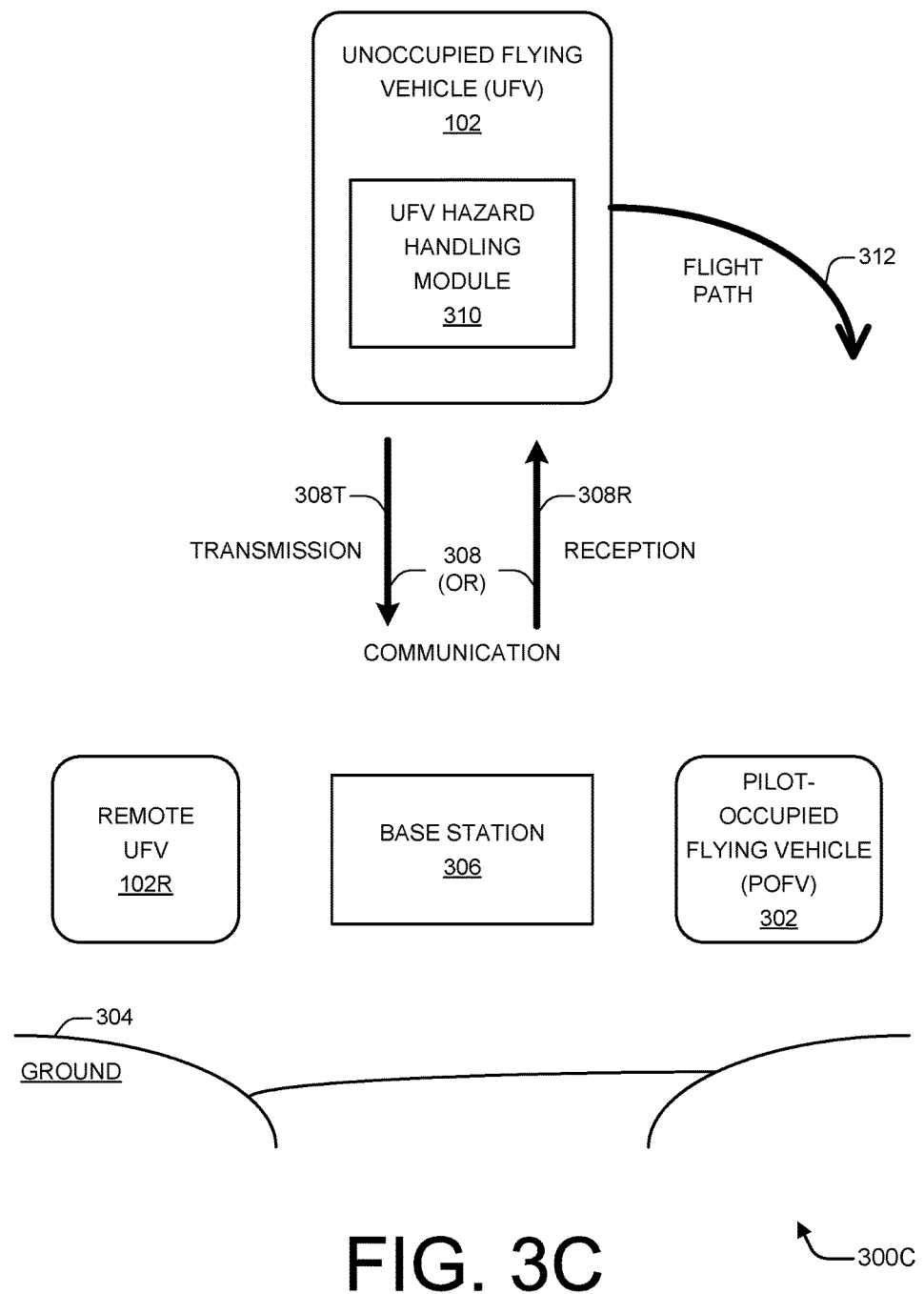

FIGS. 3A-3C are schematic diagrams 300A-300C, respectively, of example UFV hazard handling scenarios or environments in accordance with certain example embodiments. As shown in FIGS. 3A-3C, by way of example but not limitation, each of schematic diagrams 300A-300C may include at least one unoccupied flying vehicle (UFV) 102, at least one remote UFV 102R, or ground 304. In each scenario or environment of schematic diagrams 300A-300C, at least one UFV 102 may be flying above ground 304 and endeavoring to detect, sense, avoid, manage, mitigate, communicate about, coordinate over, eliminate, predict, remove, account for, remedy aftermath caused by, cooperate to address, or a combination thereof, etc. at least one hazard. For certain example embodiments, hazards may include, but are not limited to, other unoccupied flying vehicles, occupied flying vehicles, ground 304, buildings or other structures (not shown) on ground 304, moving objects, weather conditions, stationary objects, some combination thereof, or so forth. A UFV 102 may be attempting to accomplish a mission, an objective, a task, a combination thereof, or so forth. In operation, a UFV may be in communication with at least one remote UFV, at least one pilot-occupied flying vehicle (POFV), at least one base station (not shown in FIG. 3A), at least one other entity, a combination thereof, or so forth. Although scenarios or environments of schematic diagrams 300A-300C may be shown in the drawings or described herein individually or separately, at least portions or aspects of such scenarios or environments may be implemented or may otherwise occur at least partially jointly, simultaneously in time, overlapping in space, as part of a single or extended operational theater, a combination thereof, or so forth. However, claimed subject matter is not limited to any particular described embodiments, implementations, examples, etc.

FIG. 3A is a schematic diagram 300A of an example UFV hazard handling scenario or environment in accordance with certain example embodiments. As shown in FIG. 3A, by way of example but not limitation, schematic diagram 300A may include at least one UFV 102, at least one remote UFV 102R, at least one pilot-occupied flying vehicle (POFV) 302, or ground 304. More specifically, schematic diagram 300A may include a POFV 302, a first POFV 302(1), or a second POFV 302(2). For certain example embodiments, a POFV 302 may comprise or include a vehicle that is currently being controlled by an onboard human pilot. For certain example embodiments, ground 304 may include or comprise at least a portion of the earth, a landscape, a cityscape, a prairie, a hill, a mountain, a combination thereof, or so forth. However, claimed subject matter is not limited to any particular described embodiments, implementations, examples, etc.

FIG. 3B is a schematic diagram 300B of another example UFV hazard handling scenario or environment in accordance with certain example embodiments. As shown in FIG. 3B, by way of example but not limitation, schematic diagram 300B may include at least one UFV 102, at least one remote UFV 102R, ground 304, or at least one base station 306. More specifically, schematic diagram 300B may include a remote UFV 102R, a first remote UFV 102R(1), or a second remote UFV 102R(2). For certain example embodiments, a base station 306 may comprise or include a machine that is adapted to at least partially control or is capable of controlling a UFV 102 from a distance via at least one wireless communication (not explicitly shown in FIG. 3B). For certain example implementations, a base station 306 may be fixed within a building or on a mobile ground vehicle, may be capable of being hand-held, may be incorporated into or as part of another flying vehicle, a combination thereof, or so forth. For certain example implementations, a base station 306 may include or comprise a handheld controller (e.g., as may be used with an R/C model plane) for actual or near line-of-sight control, a workstation-sized or brief-case-sized controller that is mobile for operation out in the field (e.g., for police or corporate purposes), a larger apparatus that is typically stationary or may be housed in a secret or private building miles from an operational theater (e.g., for military or governmental purposes), a server-sized or distributed apparatus that provides control for a swarm of UFVs (e.g., for careful monitoring of a construction, agricultural, or warehouse site), some combination thereof, or so forth. For certain example embodiments, a base station 306 may be controlling at least one UFV, such as first remote UFV 102R(1) or second remote UFV 102R(2), while not controlling at least one other UFV, such as UFV 102 or remote UFV 102R (although it may be monitoring a UFV without controlling it). However, claimed subject matter is not limited to any particular described embodiments, implementations, examples, etc.

FIG. 3C is a schematic diagram 300C of another example UFV hazard handling scenario or environment in accordance with certain example embodiments. As shown in FIG. 3C, by way of example but not limitation, schematic diagram 300C may include at least one UFV 102, at least one remote UFV 102R, at least one POFV 302, ground 304, at least one base station 306, at least one communication 308, or at least one flight path 312. More specifically, UFV 102 may include at least one UFV hazard handling module 310, or communication 308 may include at least one transmission 308T or at least one reception 308R. For certain example embodiments, a UFV 102 may transmit at least one transmission 308T to or receive at least one reception 308R from at least one of a remote UFV 102R, a POFV 302, a base station 306, a combination thereof, or so forth. For certain example embodiments, a UFV hazard handling module 310 may affect or at least partially control a flight path of a UFV 102 at least partially based on at least one of a transmission 308T or a reception 308R. For certain example embodiments, a flight path 312 may comprise or include any one or more of: a flight trajectory, a heading, a speed, a direction, a velocity, an acceleration, a position, an altitude, a stability level, a destination, a two-dimensional course or a three-dimensional course through air or space, a course through a spherical geometrical space, a time or times at which a course is to be traversed, a time or times at which one or more positions or one or more altitudes are to be attained, a time or times at which other flight characteristic(s) are to be attained, extrapolated position-time stamp pairs based on current flight characteristic(s), extrapolated altitude-time stamp pairs based on current flight characteristic(s), a combination thereof, or so forth. However, claimed subject matter is not limited to any particular described embodiments, implementations, examples, etc.

For certain example embodiments, a remote UFV 102R, a POFV 302, or a base station 306 may participate in at least one communication 308, such as a transmission 308T or a reception 308R, with at least one UFV 102. Although not explicitly shown in schematic diagram 300C, for certain example embodiments, each of remote UFV 102R, POFV 302, or base station 306 may additionally or alternatively exchange at least one communication 308 with at least one other of remote UFV 102R, POFV 302, or base station 306. For certain example implementations, a remote UFV 102R may transmit at least one transmission 308T to or receive at least one reception 308R from at least one of a UFV 102, another remote UFV 102R, a POFV 302, a base station 306, a combination thereof, or so forth. For certain example implementations, a POFV 302 may transmit at least one transmission 308T to or receive at least one reception 308R from at least one of a UFV 102, a remote UFV 102R, another POFV 302, a base station 306, a combination thereof, or so forth. For certain example implementations, a base station 306 may transmit at least one transmission 308T to or receive at least one reception 308R from at least one of a UFV 102, a remote UFV 102R, a POFV 302, another base station 306, a combination thereof, or so forth. However, claimed subject matter is not limited to any particular described embodiments, implementations, examples, etc.

Figure 4:
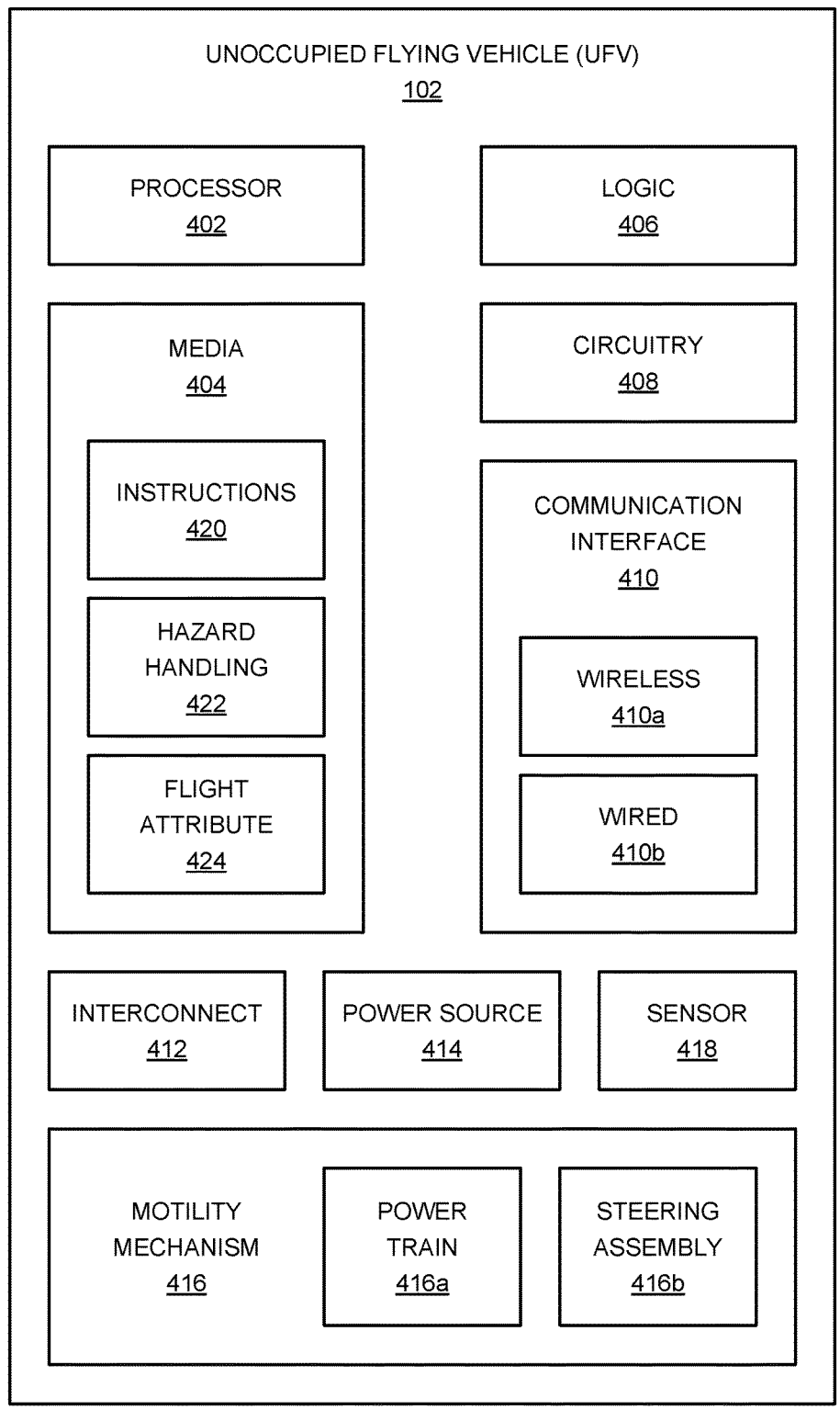
FIG. 4 is a schematic diagram of an example unoccupied flying vehicle (UFV) including one or more example components in accordance with certain example embodiments.

FIG. 4 is a schematic diagram 400 of an example unoccupied flying vehicle (UFV) including one or more example components in accordance with certain example embodiments. As shown in FIG. 4, a UFV 102 may include one or more components such as: at least one processor 402, one or more media 404, logic 406, circuitry 408, at least one communication interface 410, at least one interconnect 412, at least one power source 414, at least one motility mechanism 416, one or more sensors 418, some combination thereof, or so forth. Furthermore, as shown in schematic diagram 400, one or more media 404 may include one or more instructions 420, at least one hazard handling 422 routine, one or more flight attributes 424, some combination thereof, or so forth; a communication interface 410 may include at least one wireless communication interface 410a, at least one wired communication interface 410b, some combination thereof, or so forth; or a motility mechanism 416 may include at least one power train 416a, at least one steering assembly 416*b*, some combination thereof, or so forth. However, a UFV 102 may alternatively include more, fewer, or different component(s) from those that are illustrated without departing from claimed subject matter.

For certain example embodiments, a UFV 102 may include or comprise at least one machine that is capable of flight, flight control processing, (local) flight control, some combination thereof, or so forth. UFV 102 may include, for example, a computing platform or any electronic device having at least one processor or memory. Processor 402 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 404 may bear, store, contain, include, provide access to, or a combination thereof, etc. instructions 420, which may be executable by a processor 402; at least one hazard handling 422 routine, which may at least partially form at least a portion of instructions 420; one or more flight attributes 424; some combination thereof; or so forth. Instructions 420 may include or comprise, by way of example but not limitation, a program, a module, an application or app (e.g., that is native, that runs in a browser, that runs within a virtual machine, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 404 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, one or more hazard handling routines, one or more flight attributes, some combination thereof, or so forth.

For certain example embodiments, execution of instructions 420 by one or more processors 402 may transform at least a portion of UFV 102 into a special-purpose computing device, apparatus (e.g., a UFV machine, at least part of a motility mechanism 416, at least part of a UFV hazard handling module 310 (or other module), or a combination thereof, etc.), platform, some combination thereof, or so forth. Instructions 420 may include, for example, instructions that are capable of realizing at least a portion of one or more flow diagrams, methods, processes, procedures, operations, functionality, technology, mechanisms, or a combination thereof, etc. that are described herein or illustrated in the accompanying drawings. A hazard handling 422 routine may include, for example, instructions that are capable of realizing at least a portion of one or more flow diagrams, methods, processes, procedures, operations, functionality, technology, mechanisms, or a combination thereof, etc. that are described herein or illustrated in the accompanying drawings or that are directed toward detecting, sensing, avoiding, managing, mitigating, communicating about, coordinating over, eliminating, predicting, removing, accounting for, remedying aftermath caused by, cooperating to address, or a combination thereof, etc. at least one hazard.

A flight attribute 424 may include, for example, data describing or representing at least one flight attribute of a UFV, such as one or more flight characteristics, one or more flight capabilities, a combination thereof, or so forth. Additionally or alternatively, at least a portion of flight attributes 424 may be at least partially accessible to or integrated with hazard handling 422.

For certain example embodiments, logic 406 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 408 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 408 includes at least one physical or hardware component or aspect.

For certain example embodiments, one or more communication interfaces 410 may provide one or more interfaces between UFV 102 and another machine or a person/operator. With respect to a person/operator, a communication interface 410 may include, by way of example but not limitation, a screen, a speaker, keys/buttons, a microphone, or other person-device input/output apparatuses. A wireless communication interface 410*a* or a wired communication interface 410*b* may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, or a combination thereof, etc.), a physical or logical network adapter or port, a frequency converter, a baseband processor, a photoreceptor, or a combination thereof, etc. to communicate wireless signals or wired signals via one or more wireless communication links or wired communication links, respectively. Communications with at least one communication interface 410 may enable transmitting, receiving, or initiating of transmissions, just to name a few examples.

For certain example embodiments, at least one interconnect 412 may enable signal communication between or among components of UFV 102. Interconnect 412 may include, by way of example but not limitation, one or more buses, channels, switching fabrics, some combination thereof, or so forth. Although not explicitly illustrated in FIG. 4, one or more components of UFV 102 may be coupled to interconnect 412 via a discrete or integrated interface. By way of example only, one or more interfaces may couple a communication interface 410 or a processor 402 to at least one interconnect 412. For certain example embodiments, at least one power source 414 may provide power to one or more components of UFV 102. Power source 414 may include, by way of example but not limitation, a battery, a power connector, a solar power source or charger, a mechanical power source or charger, a fuel source, a generator, an engine, some combination thereof, or so forth.

For certain example embodiments, at least one sensor 418 may sense, produce, or otherwise provide at least one sensor value. Sensors 418 may include, by way of example only, a camera, a microphone, an accelerometer, a thermometer, a satellite positioning system (SPS) sensor, a barometer, a humidity sensor, a compass, an altimeter, an airspeed detector, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), some combination thereof, or so forth. Values provided by at least one sensor 418 may include, by way of example but not limitation, an image/video, a sound recording, an acceleration value, a temperature, one or more SPS coordinates, a barometric pressure, a humidity level, a compass direction, an altitude, an airspeed, a gyroscopic value, a magnetic reading, a pressure value, an oscillation value, an ambient light reading, inertial readings, touch detections, proximate object location, flex detections, some combination thereof, or so forth.

For certain example embodiments, a motility mechanism 416 may enable UFV 102 to fly, overcome gravitational forces, overcome wind resistance or drag, accelerate, avoid a hazard, some combination thereof, or so forth. For certain example embodiments, a power train 416a of a motility mechanism 416 may include one or more components that work separately or at least partially together to transform or convert stored energy into kinetic energy in order to propel UFV 102. For certain example implementations, a power train 416a may include at least one engine, at least one transmission, one or more blades or propellers, at least one motor, some combination thereof, or so forth. For certain example embodiments, a steering assembly 416b of a motility mechanism 416 may include one or more components that work separately or at least partially together to transform propulsive kinetic energy into forward, backward, up, down, right, left, a combination thereof, etc. movement or some other directionality change for a UFV. For certain example implementations, a steering assembly 416b may include at least one aileron, at least one rudder, at least one elevator, one or more blades or propellers, at least one transmission that routes power to different motors or other propulsive components, at least one rotor disk tilter, at least one blade pitch angle changer, or a combination thereof, or so forth. Although illustrated separately in schematic diagram 400, power train 416a and steering assembly 416b may be implemented at least partially jointly to realize motility mechanism 416.

However, claimed subject matter is not limited to any particular described embodiments, implementations, examples, or so forth. For instance, it should be understood that for certain example implementations components that are illustrated separately in FIG. 4 may not necessarily be separate or mutually exclusive. For example, a given component may provide multiple functionalities. By way of example only, a single component such as a photodetector may function as a wireless communication interface 410a or a sensor 418. Additionally or alternatively, one or more instructions 420 may function to realize or embody at least part of hazard handling 422 or flight attributes 424.

It should also be understood that for certain example implementations components that are illustrated in schematic diagram 400 or described herein may or may not be integral with or integrated into or onto a UFV 102. For example, a component may be removably connected to a UFV 102, a component may be wirelessly coupled to a UFV 102, some combination thereof, or so forth. By way of example only, instructions 420 may be stored on a removable card having at least one medium 404. Additionally or alternatively, at least a portion of a motility mechanism 416, such as an engine or a fuel source, may be detachable from or replaceable with a UFV 102. However, claimed subject matter is not limited to any particular described embodiments, implementations, examples, etc.

Figure 5:
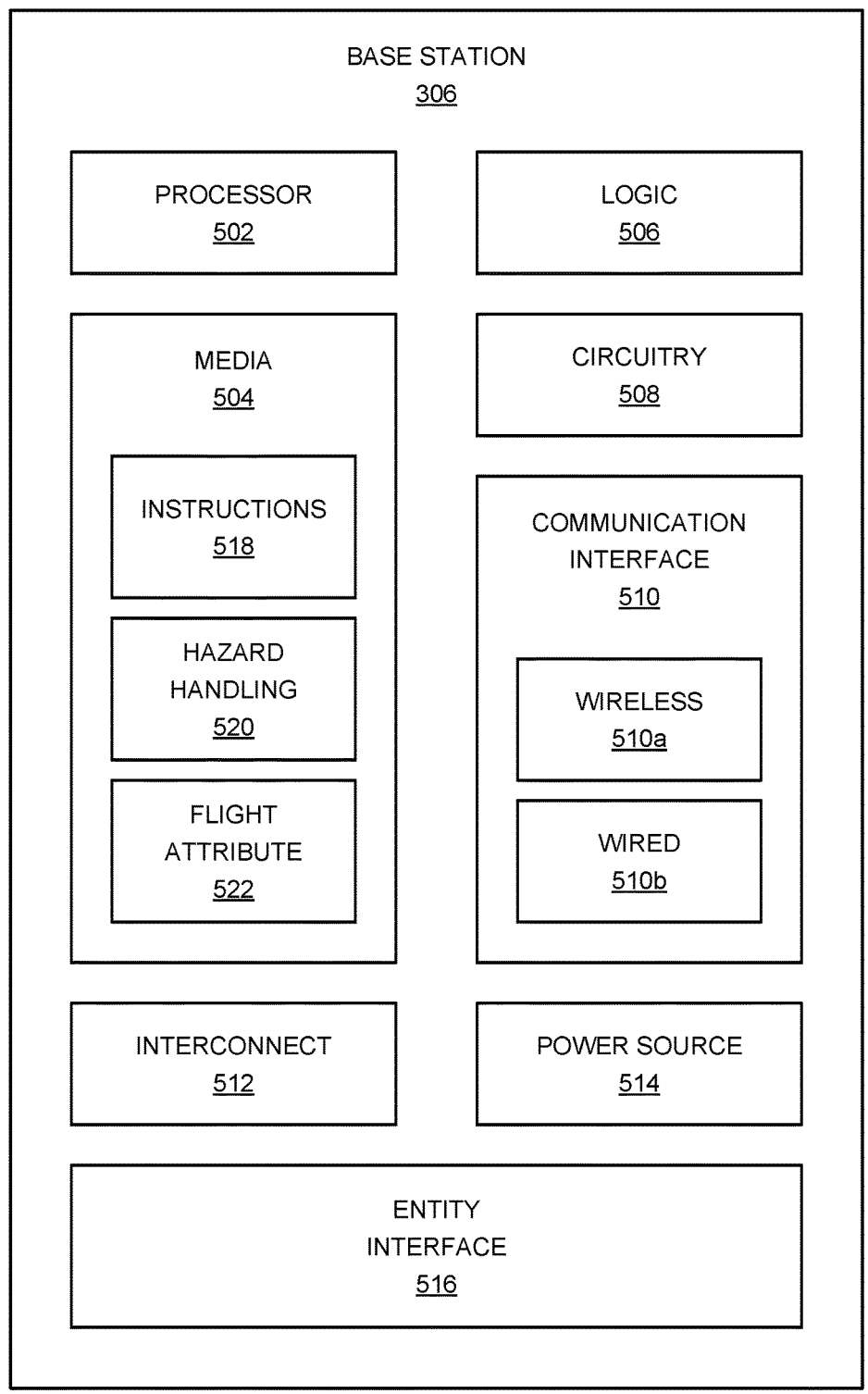
FIG. 5 is a schematic diagram of an example base station, which may be in communication with at least one UFV, including one or more example components for a base station in accordance with certain example embodiments.

FIG. 5 is a schematic diagram 500 of an example base station, which may be in communication with at least one UFV (not shown in FIG. 5), including one or more example components for a base station in accordance with certain example embodiments. As shown in FIG. 5, a base station 306 may include one or more components such as: at least one processor 502, one or more media 504, logic 506, circuitry 508, at least one communication interface 510, at least one interconnect 512, at least one power source 514, at least one entity interface 516, some combination thereof, or so forth. Furthermore, as shown in schematic diagram 500, one or more media 504 may include one or more instructions 518, at least one hazard handling 520 routine, at least one flight attribute 522, some combination thereof, or so forth; or communication interface 510 may include at least one wireless communication interface 510a, at least one wired communication interface 510b, some combination thereof, or so forth. However, a base station 306 may alternatively include more, fewer, or different component(s) from those that are illustrated without departing from claimed subject matter.

For certain example embodiments, a base station 306 may include or comprise at least one machine that is capable of flight control processing, (distant) flight control, some combination thereof, or so forth. Base station 306 may include, for example, a computing platform or any electronic device or devices having at least one processor or memory. Processor 502 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/ fixed logic circuitry, controllers, micro-controllers, microprocessors, some combination thereof, or so forth. Media 504 may bear, store, contain, include, provide access to, or a combination thereof, etc. instructions 518, which may be executable by a processor 502; at least one hazard handling 520 routine, which may at least partially form at least a portion of instructions 518; one or more flight attributes 522; some combination thereof; or so forth. Instructions 518 may include or comprise, by way of example but not limitation, a program, a module, an application or app (e.g., that is native, that runs in a browser, that runs within a virtual machine or server, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 504 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, one or more hazard handling routines, one or more flight attributes, some combination thereof, or so forth.

For certain example embodiments, execution of instructions 518 by one or more processors 502 may transform at least a portion of base station 306 into a special-purpose computing device, apparatus, platform, some combination thereof, or so forth. Instructions 518 may include, for example, instructions that are capable of realizing at least a portion of one or more flow diagrams methods, processes, procedures, operations, functionality, technology, mechanisms, or a combination thereof, etc. that are described herein or illustrated in the accompanying drawings. A hazard handling 520 routine may include, for example, instructions that are capable of realizing at least a portion of one or more flow diagrams, methods, processes, procedures, operations, functionality, technology, mechanisms, or a combination thereof, etc. that are described herein or illustrated in the accompanying drawings and that are directed toward interacting with at least one UFV to facilitate detecting, seeing, avoiding, managing, mitigating, communicating about, coordinating over, eliminating, predicting, removing, accounting for, remedying aftermath caused by, cooperating to address, or a combination thereof, etc. at least one hazard. A flight attribute 522 may include, for example, data describing or representing at least one flight attribute, such as one or more flight characteristics, one or more flight capabilities, a combination thereof, etc. of at least one UFV that base station 306 is communicating with, is at least partially controlling, is monitoring, some combination thereof, or so forth. Additionally or alternatively, at least a portion of flight attributes 522 may be at least partially accessible to or integrated with hazard handling 520.

For certain example embodiments, logic 506 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 508 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 508 includes at least one physical or hardware component or aspect.

For certain example embodiments, one or more communication interfaces 510 may provide one or more interfaces between base station 306 and another machine or a person/operator/entity directly or indirectly. A wireless communication interface 510a or a wired communication interface 510b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, a gateway, or a combination thereof, etc.), a physical or logical network adapter or port, a frequency converter, a baseband processor, an internet or telecommunications backbone connector, a fiber optic connector, a storage area network (SAN) connector, or a combination thereof, etc. to communicate wireless signals or wired signals via one or more wireless communication links or wired communication links, respectively. Communications with at least one communication interface 510 may enable transmitting, receiving, or initiating of transmissions, just to name a few examples.

For certain example embodiments, at least one interconnect 512 may enable signal communication between or among components of base station 306. Interconnect 512 may include, by way of example but not limitation, one or more buses, channels, switching fabrics, local area networks (LANs), storage area networks (SANs), some combination thereof, or so forth. Although not explicitly illustrated in FIG. 5, one or more components of base station 306 may be coupled to interconnect 512 via a discrete or integrated interface. By way of example only, one or more interfaces may couple a processor 502 or a medium 504 to at least one interconnect 512. For certain example embodiments, at least one power source 514 may provide power to one or more components of base station 306. Power source 514 may include, by way of example but not limitation, a power connector for accessing an electrical grid, a fuel cell, a solar power source, one or more batteries, some combination thereof, or so forth.

For certain example embodiments, an entity interface 516 may enable one or more entities (e.g., a person, a group, an electronic agent, a robotic entity, or a combination thereof, etc.) to provide input to or receive output from base station 306. Interactions between an entity and a base station may relate, by way of example but not limitation, to inputting or outputting instructions, commands, settings, flight characteristics, flight capabilities, some combination thereof, or so forth. Certain entity interfaces 516 may enable both entity input and entity output at base station 306 or over at least one network link.

However, claimed subject matter is not limited to any particular described embodiments, implementations, examples, or so forth. For instance, it should be understood that for certain example implementations components that are illustrated separately in FIG. 5 need not necessarily be separate or mutually exclusive. For example, a given component may provide multiple functionalities. By way of example only, hard-wired logic 506 may form circuitry 508. Additionally or alternatively, a single component such as a connector may function as a communication interface 510 or as an entity interface 516. Additionally or alternatively, one or more instructions 518 may function to realize or embody at least part of hazard handling 520 or flight attributes 522.

It should also be understood that for certain example implementations components that are illustrated in schematic diagram 500 or described herein may not be integral or integrated with a base station 306. For example, a component may be removably connected to a base station 306, a component may be wirelessly coupled to a base station 306, one or more components of a base station 306 may be geographically distributed or separated from one another, some combination thereof, or so forth. By way of example only, instructions 518 may be stored on one medium 504, and flight attributes 522 (or another portion of instructions 518) may be stored on a different medium 504, which may be part or a same server or a part of a different server of, e.g., a server farm. Additionally or alternatively, respective processor-media pairs, if any, may be physically realized on different or respective server blades or server containers for a base station 306 that is implemented on server hardware. However, claimed subject matter is not limited to any particular described embodiments, implementations, examples, etc.

Figure 6A:
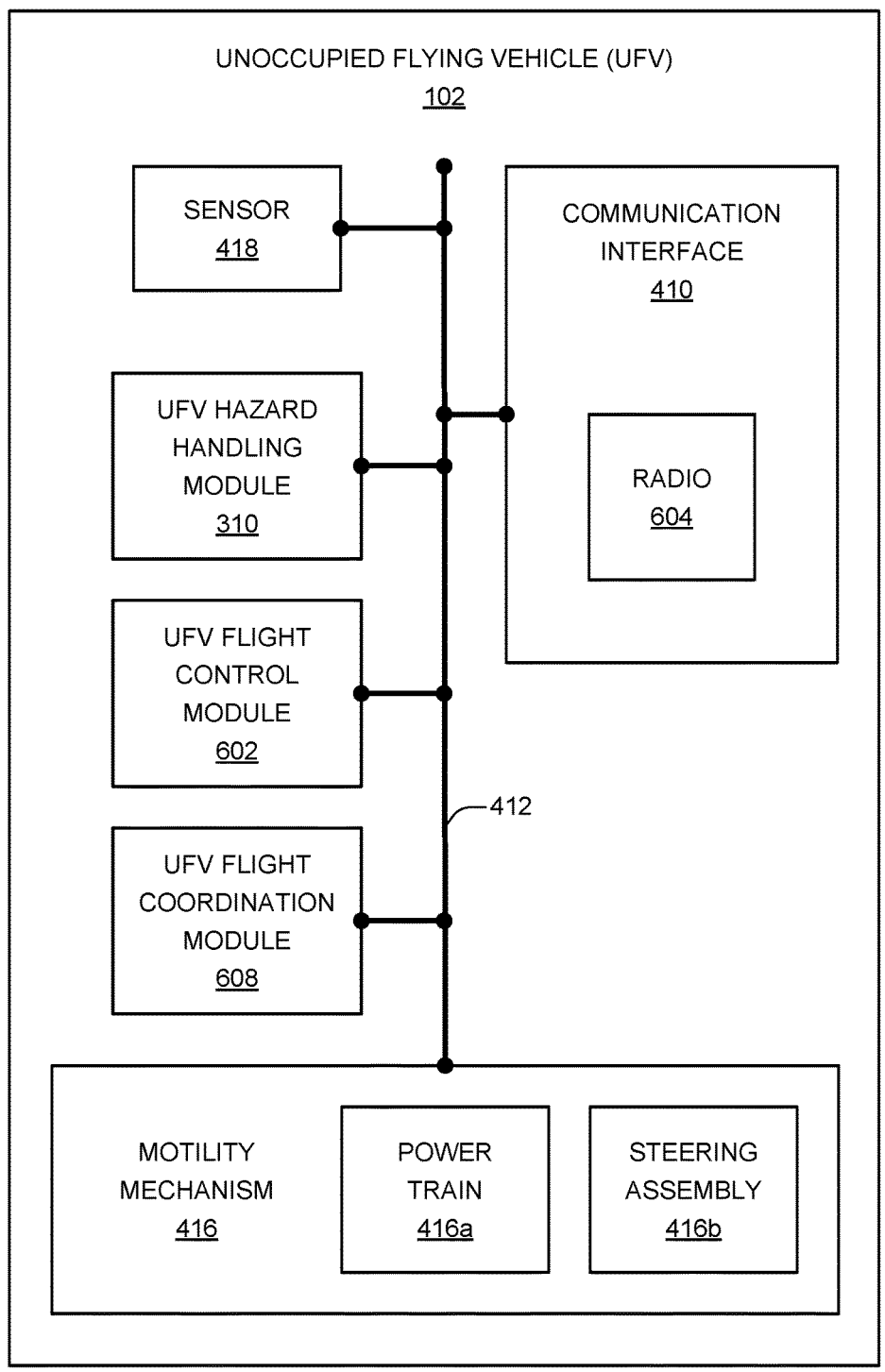
FIG. 6A is a schematic diagram of an example UFV that has one or more functional modules or one or more operational components in accordance with certain example embodiments.

FIG. 6A is a schematic diagram 600A of an example UFV that has one or more functional modules or one or more operational components in accordance with certain example embodiments. As shown in FIG. 6A, example UFV 102 of schematic diagram 600A may include, by way of example but not limitation, at least one UFV hazard handling module 310, at least one communication interface 410, at least one interconnect 412, at least one motility mechanism 416, one or more sensors 418, at least one UFV flight control module 602, or at least one UFV flight coordination module 608. More specifically, communication interface 410 may include at least one radio 604, or so forth; or motility mechanism 416 may include at least one power train 416a, at least one steering assembly 416b, some combination thereof, or so forth. However, a UFV 102 may alternatively include more, fewer, or different module(s) or component(s) from those that are illustrated without departing from claimed subject matter.

For certain example embodiments, a UFV hazard handling module 310, a UFV flight control module 602, a UFV flight coordination module 608, or some combination thereof, etc. may operate to implement, perform, facilitate performance of, or a combination thereof, etc. one or more flow diagrams, methods, processes, procedures, operations, functionality, technology, modules, mechanisms, or a combination thereof, etc. that are described herein or illustrated in the accompanying drawings or that relate to handling an actual or a potential hazard. Example aspects related to hazard handling in a UFV context are described further herein above and below. Although UFV hazard handling module 310, UFV flight control module 602, and UFV flight coordination module 608 are illustrated separately in schematic diagram 600A, they may additionally or alternatively be implemented at least partially in combination, jointly, with an overlapping functionality, some combination thereof, or so forth. For certain example embodiments, and by way of example but not limitation, at least a portion of one or more modules (e.g., module 702, module 704, or a combination thereof, etc.) that are described herein below with particular reference to FIG. 7A may be implemented as at least part of UFV hazard handling module 310, as at least part of UFV flight control module 602, as at least part of UFV flight coordination module 608, some combination thereof, or so forth. However, claimed subject matter is not limited to any particular described embodiments, implementations, examples, etc.

For certain example embodiments, a module of a UFV 102 may include or be comprised of at least one processor (e.g., a processor 402 of FIG. 4, etc.), one or more media (e.g., a medium 404 of FIG. 4, etc.), executable instructions (e.g., processor-executable instructions, instructions 420 of FIG. 4, computer-implementable instructions, etc.) incorporated into one or more media, logic (e.g., logic 406 of FIG. 4, etc.), circuitry (e.g., circuitry 408 of FIG. 4, etc.), other described or illustrated component(s), may be comprised as otherwise described herein, some combination thereof, or so forth. For certain example implementations, one or more modules (e.g., a UFV hazard handling module 310, a UFV flight control module 602, a UFV flight coordination module 608, or a combination thereof, etc.) of at least one UFV 102 may function or interoperate with one or more modules of at least one other UFV (e.g., a remote UFV 102R), at least one POFV 302, at least one base station 306 (e.g., each of FIGS. 3A-3C or FIG. 6B), or a combination thereof, etc. via at least one radio 604 of UFV 102, such as by sending one or more commands to another UFV (e.g., a remote UFV 102R) directly or indirectly (e.g., with a third UFV forming a relay, with a base station of the other UFV forwarding a command, a combination thereof, etc.). However, claimed subject matter is not limited to any particular described embodiments, implementations, examples, etc.

For certain example embodiments, UFV 102 may be in constant, infrequent, regular, irregular, intermittent, occasional, scheduled, unscheduled, a combination thereof, etc. communication with at least one remote UFV 102R, at least one POFV 302, at least one base station 306, or a combination thereof, etc. via at least one radio 604. One or more sensors 418 or at least one radio 604 may feed sensor readings, telemetry, flight attributes, weather conditions, topographical maps, coordination parameters, one or more automated hazard handling routines, a combination thereof, etc. to UFV hazard handling module 310, UFV flight control module 602, UFV flight coordination module 608, a combination thereof, or so forth. For certain example implementations, UFV hazard handling module 310 may at least make hazard-related flight control decisions or provide flight control input to UFV flight control module 602 or UFV flight coordination module 606 with regard to handling actual or potential hazards. For certain example implementations, UFV flight control module 602 may at least partially make flight control decisions or provide flight control commands to motility mechanism 416 so as to implement flight control decisions, including, by way of example but not limitation, based at least partly on flight control input provided by UFV hazard handling module 310. For certain example embodiments, UFV flight coordination module 608 may at least make multi-UFV coordination flight control decisions or make flight control decisions for at least one other UFV (e.g., at least one remote UFV 102R) or provide flight control input to UFV flight control module 602 or UFV hazard handling module 310 with regard to controlling at least one other UFV or with regard to coordinating two or more UFVs (e.g., including one or more other UFVs), with or without involvement by a base station. For certain example implementations, UFV flight coordination module 608 may at least partially make flight control decisions or formulate flight control commands for UFV 102 or another UFV (e.g., via transmission using radio 604 to another UFV and possible application to a motility mechanism 416 (e.g., of FIG. 6A) of the other UFV) so as to realize flight control decisions, including, by way of example but not limitation, based at least partly on flight control input provided by at least UFV hazard handling module 310 or a base station 306 (e.g., of FIG. 6B). Additionally or alternatively, a UFV hazard handling module 310 may supply flight control input, including by way of example but not limitation with at least one flight control command, directly (e.g., without routing it first through UFV flight control module 602 or UFV flight coordination module 608) to motility mechanism 416. To implement flight control decisions, including flight control commands, motility mechanism 416 may employ power train 416a to provide at least one propulsive force or may employ steering assembly 416b to provide at least one directional change. However, claimed subject matter is not limited to any particular described embodiments, implementations, examples, etc.

Figure 6B:
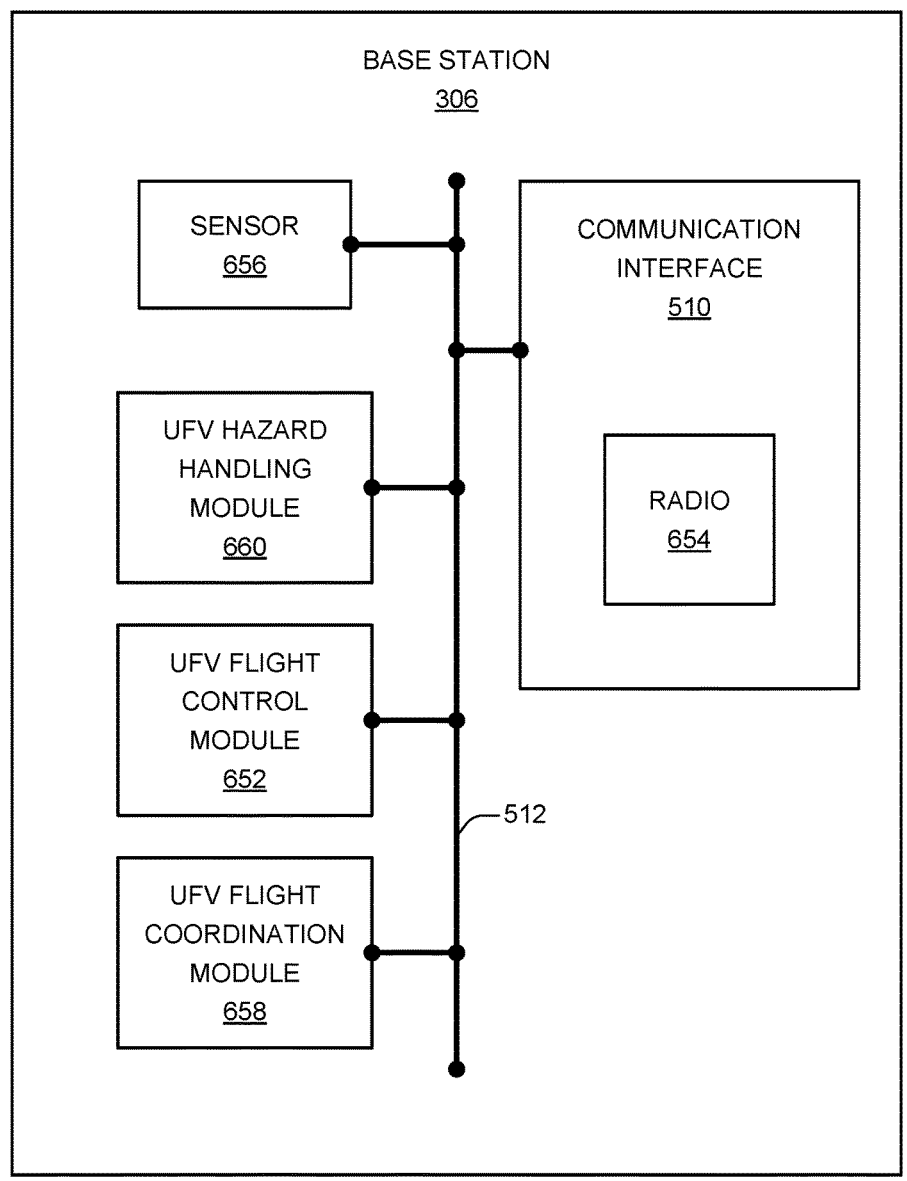
FIG. 6B is a schematic diagram of an example base station that has one or more functional modules or one or more operational components in accordance with certain example embodiments.

FIG. 6B is a schematic diagram 600B of an example base station that has one or more functional modules or one or more operational components in accordance with certain example embodiments. As shown in FIG. 6B, example base station 306 of schematic diagram 600B may include, by way of example but not limitation, at least one communication interface 510, at least one interconnect 512, at least one UFV flight control module 652, at least one sensor 656, at least one UFV flight coordination module 658, or at least one UFV hazard handling module 660. More specifically, communication interface 510 may include at least one radio 654, or so forth. However, a base station 306 may alternatively include more, fewer, or different module(s) or component(s) from those that are illustrated without departing from claimed subject matter. Moreover, module(s) or component(s) that are illustrated in schematic diagram 600B may alternatively or additionally be separate from or nonintegrated with a base station 306, such as being external to a housing of or remotely-accessible to a base station 306, for certain example implementations.

For certain example embodiments, a UFV hazard handling module 660, a UFV flight coordination module 658, a UFV flight control module 652, or a combination thereof, etc. may operate to implement, perform, facilitate performance of, or a combination thereof, etc. one or more flow diagrams, methods, processes, procedures, operations, functionality, technology, modules, mechanisms, or a combination thereof, etc. that are described herein or illustrated in the accompanying drawings or that relate to handling of an actual or a potential hazard. Example aspects related to hazard handling in a UFV context with at least one base station are described further herein above and below. Although UFV hazard handling module 660, UFV flight control module 652, and UFV flight coordination module 658 are illustrated separately in schematic diagram 600B, they may additionally or alternatively be implemented at least partially in combination, jointly, with an overlapping functionality, some combination thereof, or so forth. However, claimed subject matter is not limited to any particular described embodiments, implementations, examples, etc.

For certain example embodiments, a module of a base station 306 may include or be comprised of at least one processor (e.g., a processor 502 of FIG. 5, etc.), one or more media (e.g., a medium 504 of FIG. 5, etc.), executable instructions (e.g., processor-executable instructions, instructions 518 of FIG. 5, computer-implementable instructions, etc.) incorporated into one or more media, logic (e.g., logic 506 of FIG. 5, etc.), circuitry (e.g., circuitry 508 of FIG. 5, etc.), other described or illustrated component(s), may be comprised as otherwise described herein, some combination thereof, or so forth. For certain example embodiments, one or more modules (e.g., a UFV hazard handling module 660, a UFV flight control module 652, a UFV flight coordination module 658, or a combination thereof, etc.) of at least one base station 306 may function or interoperate with one or more modules of at least one UFV 102, at least one remote UFV 102R, at least one POFV 302, at least one other base station 306 (e.g., each of FIG. 3A-3C or 6A), or a combination thereof, etc. via at least one radio 654 (or via a wired connection (not explicitly shown in FIG. 6B) of a communication interface 510) of base station 306, such as by sending one or more commands to a UFV 102. However, claimed subject matter is not limited to any particular described embodiments, implementations, examples, etc.

For certain example embodiments, a base station 306 may be in constant, infrequent, regular, irregular, intermittent, occasional, scheduled, unscheduled, a combination thereof, etc. communication with at least one UFV 102, at least one remote UFV 102R, at least one POFV 302, at least one first UFV, at least one second UFV, at least one other base station 306, or a combination thereof, etc. via at least one radio 654. For certain example implementations, one or more sensors 656 (e.g., such as one or more of example sensor types described herein above with particular reference to sensor 418 (e.g., for a UFV 102 of FIG. 4)) or at least one radio 654 may feed sensor readings, telemetry, flight attributes, weather conditions, topographical maps, coordination parameters, at least one automated hazard handling routine, a combination thereof, etc. to UFV hazard handling module 660, UFV flight control module 652, UFV flight coordination module 658, a combination thereof, or so forth. For certain example embodiments, UFV hazard handling module 660 may at least make hazard-related flight control decisions or provide flight control input to UFV flight control module 652 or UFV flight coordination module 658 with regard to handling actual or potential hazards. For certain example embodiments, UFV flight coordination module 658 may at least make multi-UFV coordination flight control decisions or provide flight control input to UFV flight control module 652 or UFV hazard handling module 660 with regard to coordinating two or more UFVs, with or without involvement by another base station. For certain example embodiments, UFV flight control module 652 may at least partially make flight control decisions or formulate flight control commands (e.g., for transmission via radio 654 to a UFV 102 and possible application to a motility mechanism 416 (e.g., of FIG. 6A) thereof) so as to realize flight control decisions, including, by way of example but not limitation, based at least partly on flight control input provided by at least UFV hazard handling module 660 or UFV flight coordination module 658. However, claimed subject matter is not limited to any particular described embodiments, implementations, examples, etc.

FIG. 7A is a schematic diagram 700A that includes at least one example machine, such as an unoccupied flying vehicle (UFV), that is capable of handling scenarios for UFV location assurance in accordance with certain example embodiments. As shown in FIG. 7A, by way of example but not limitation, schematic diagram 700A includes at least one machine that may include at least one satellite positioning system (SPS) coordinate obtainment module 702 or at least one assurance analysis performance module 704. More specifically, schematic diagram 700A may include a machine that includes or comprises at least one UFV 102. By way of example but not limitation, an SPS coordinate obtainment module 702 or an assurance analysis performance module 704 may include or comprise or be realized with at least one processor that executes instructions (e.g., sequentially, in parallel, at least partially overlapping in a time-multiplexed fashion, at least partially across multiple cores, or a combination thereof, etc.) as at least one special-purpose computing component, or otherwise as described herein. However, claimed subject matter is not limited to any particular described embodiments, implementations, examples, etc.

For certain example embodiments, an SPS coordinate obtainment module 702 or an assurance analysis performance module 704 may be implemented separately or at least partially jointly or in combination. For certain example implementations, an SPS coordinate obtainment module 702 may be configured to obtain one or more satellite positioning system (SPS) coordinates corresponding to at least an apparent location of at least one UFV. For certain example implementations, an assurance analysis performance module 704 may be configured to perform at least one analysis that uses at least one or more SPS coordinates and at least one assurance token. However, claimed subject matter is not limited to any particular described embodiments, implementations, examples, etc.

FIGS. 7B-7E are schematic diagrams 700B-700E that include at least one example machine and that depict example scenarios for implementing UFV location assurance in accordance with certain example embodiments. As shown in FIGS. 7B-7E, by way of example but not limitation, one or more of schematic diagrams 700B-700E may include at least one UFV 102, at least one SPS coordinate obtainment module 702 or at least one obtainment 706, at least one assurance analysis performance module 704 or at least one performance 708, at least one satellite positioning system (SPS) coordinate 710, at least one location 712, at least one analysis 714, or at least one assurance token 716.

Each of schematic diagrams 700B-700E may include alternative or additional depictions, which may relate to UFV location assurance, as described herein. In addition to or in alternative to description herein below with specific reference to FIGS. 7B-7E, illustrated aspects of schematic diagrams 700B-700E may be relevant to example description with reference to FIG. 8A-8C, 9A-9C, or 10A-10B. However, claimed subject matter is not limited to any particular described embodiments, implementations, examples, etc.

Figure 7B:
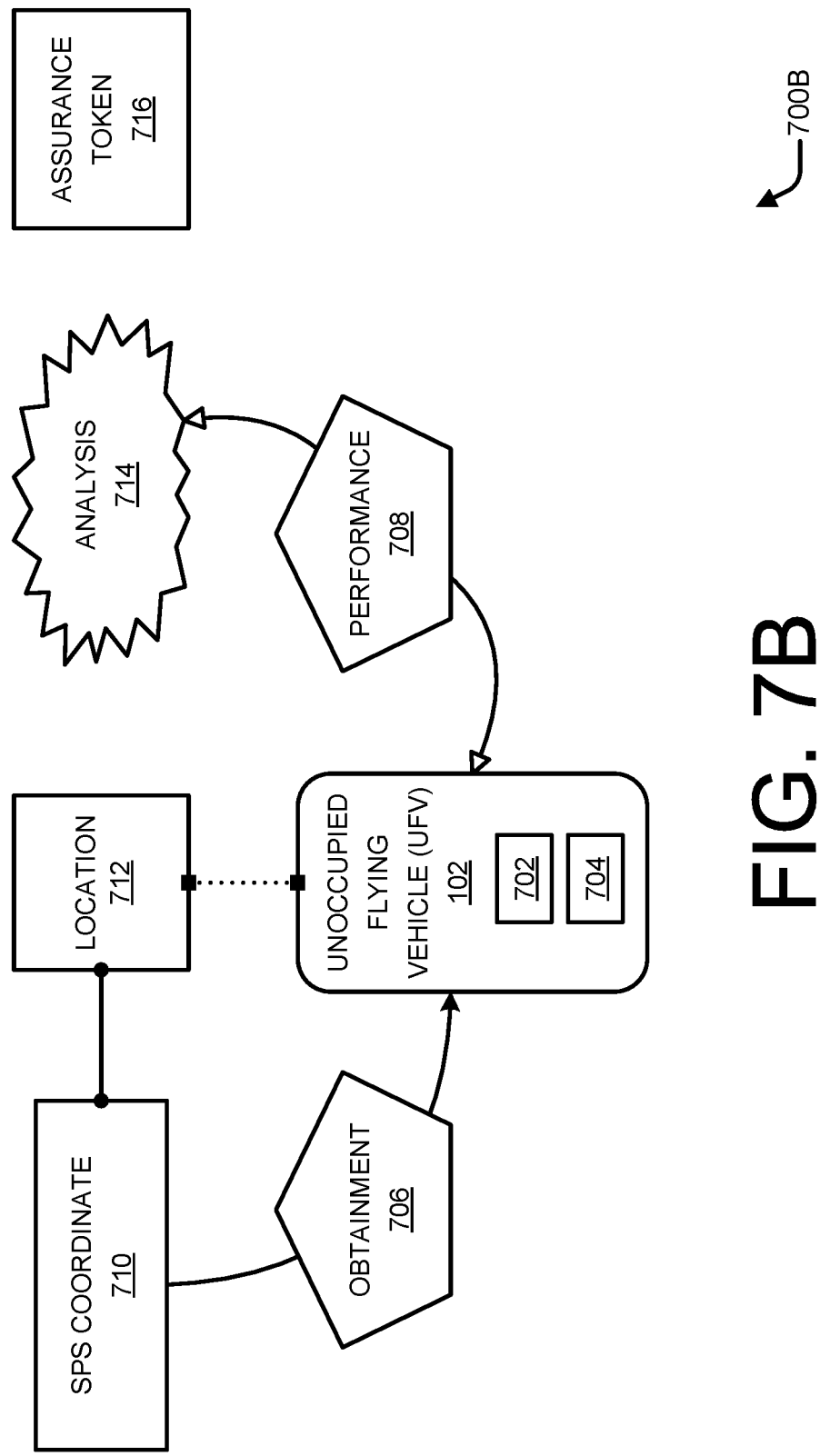
FIGS. 7B-7E are schematic diagrams that include at least one example machine and that depict example scenarios for implementing UFV location assurance in accordance with certain example embodiments.

As shown in FIG. 7B, by way of example but not limitation, schematic diagram 700B may include at least one UFV 102, at least one satellite positioning system (SPS) coordinate obtainment module 702, at least one obtainment 706, at least one assurance analysis performance module 704, at least one performance 708, at least one SPS coordinate 710, at least one location 712, at least one analysis 714, or at least one assurance token 716. For certain example embodiments, at least one SPS coordinate obtainment module 702 of a UFV 102 may effectuate at least one obtainment 706 of one or more SPS coordinates 710 corresponding to at least an (e.g., apparent) location 712 of at least one UFV 102. For certain example embodiments, at least one assurance analysis performance module 704 of a UFV 102 may effectuate at least one performance 708 of at least one analysis 714 using one or more SPS coordinates 710 and at least one assurance token 716. Additional or alternative description that may be relevant to schematic diagram 700B is provided herein below with particular reference to one or more of any of FIG. 8A-8C, 9A-9C, or 10A-10B, including but not limited to at least FIG. 8A.

Figure 7C:
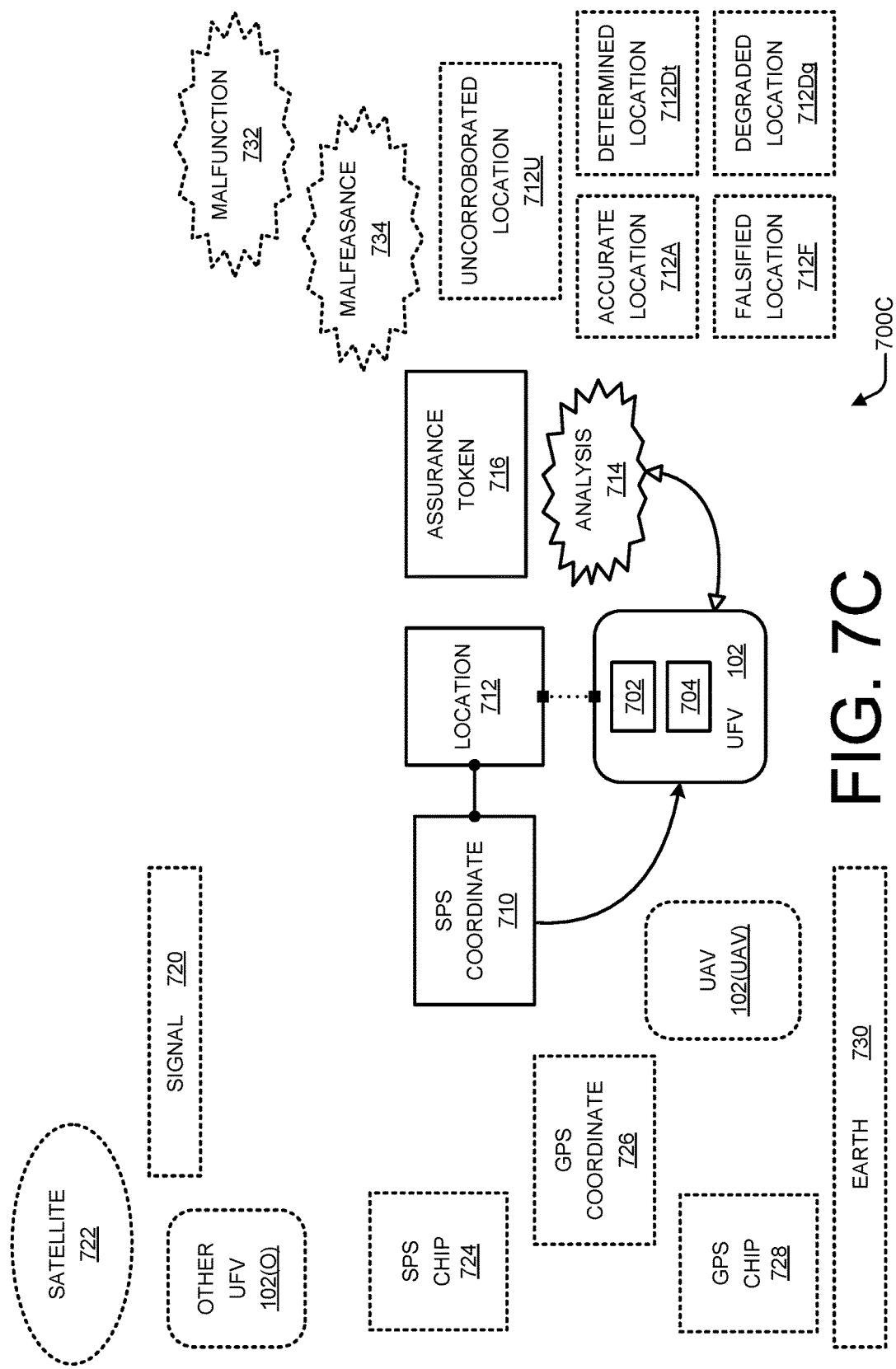

As shown in FIG. 7C, by way of example but not limitation, schematic diagram 700C may include at least one UFV 102, at least one SPS coordinate obtainment module 702, at least one assurance analysis performance module 704, at least one SPS coordinate 710, at least one location 712, at least one analysis 714, at least one assurance token 716, at least one signal 720, at least one satellite 722, at least one unmanned aerial vehicle (UAV) 102(UAV), at least one other UFV 102(O), at least one SPS chip 724, at least one global positioning system (GPS) coordinate 726, at least one GPS chip 728, (at least one) earth 730, at least one determined location 712Dt, at least one uncorroborated location 712U, at least one accurate location 712A, at least one falsified location 712F, at least one degraded location 712Dg, at least one malfunction 732, or at least one malfeasance 734. Additional or alternative description that may be relevant to schematic diagram 700C is provided herein below with particular reference to one or more of any of FIG. 8A-8C, 9A-9C, or 10A-10B, including but not limited to at least FIG. 8B-8C.

Figure 7D:
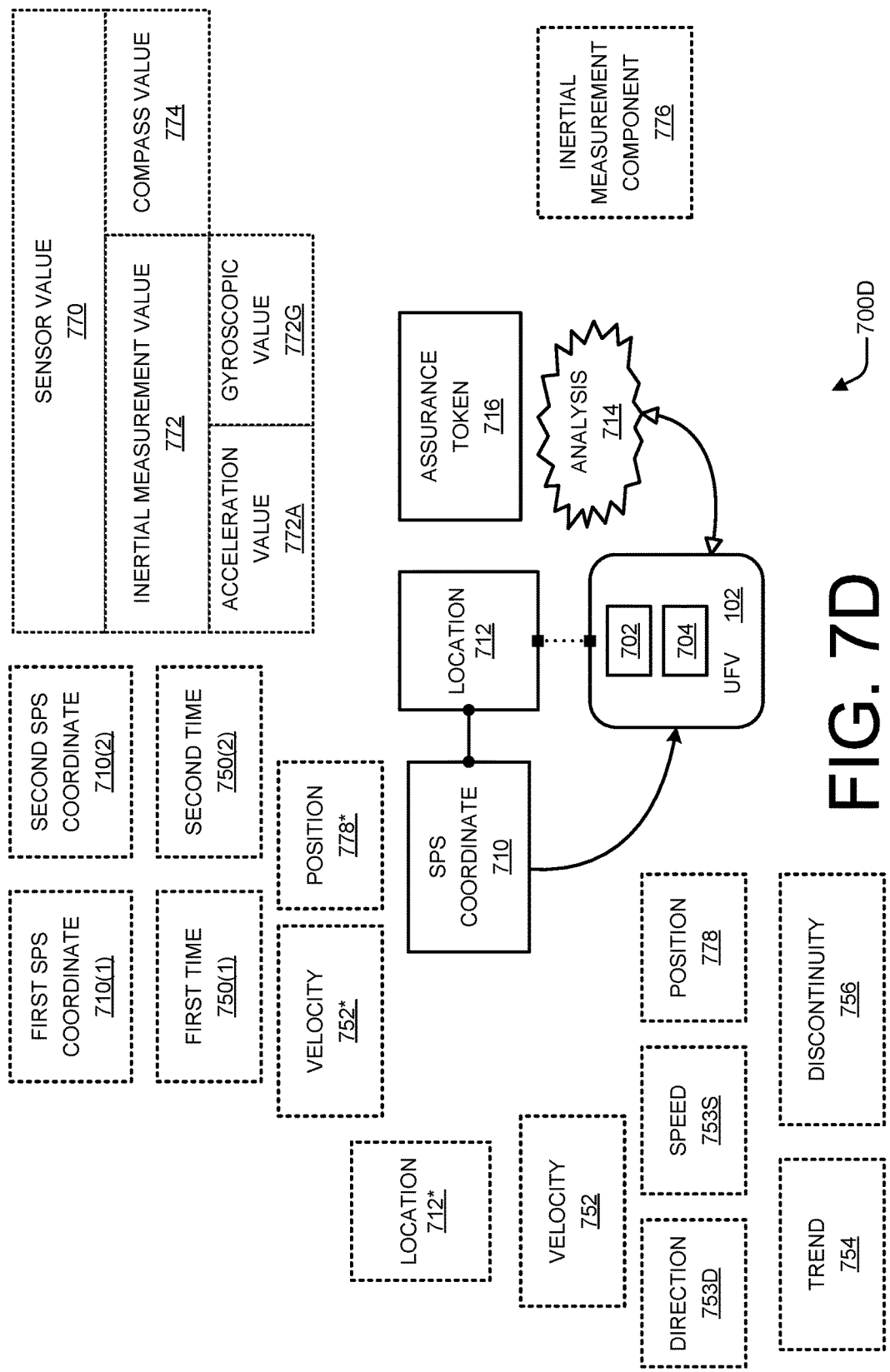

As shown in FIG. 7D, by way of example but not limitation, schematic diagram 700D may include at least one UFV 102, at least one SPS coordinate obtainment module 702, at least one assurance analysis performance module 704, at least one SPS coordinate 710, at least one location 712, at least one analysis 714, at least one assurance token 716, at least one first SPS coordinate 710(1), at least one second SPS coordinate 710(2), at least one first time 750(1), at least one second time 750(2), at least one location 712*, at least one velocity 752, at least one velocity 752*, at least one direction 753D, at least one speed 753S, at least one trend 754, at least one discontinuity 756, at least one sensor value 770, at least one inertial measurement value 772, at least one acceleration value 772A, at least one gyroscopic value 772G, at least one compass value 774, at least one inertial measurement component 776, at least one position 778, or at least one position 778*. Additional or alternative description that may be relevant to schematic diagram 700D is provided herein below with particular reference to one or more of any of FIG. 8A-8C, 9A-9C, or 10A-10B, including but not limited to one or more of any of FIGS. 9A-9B.

Figure 7E:
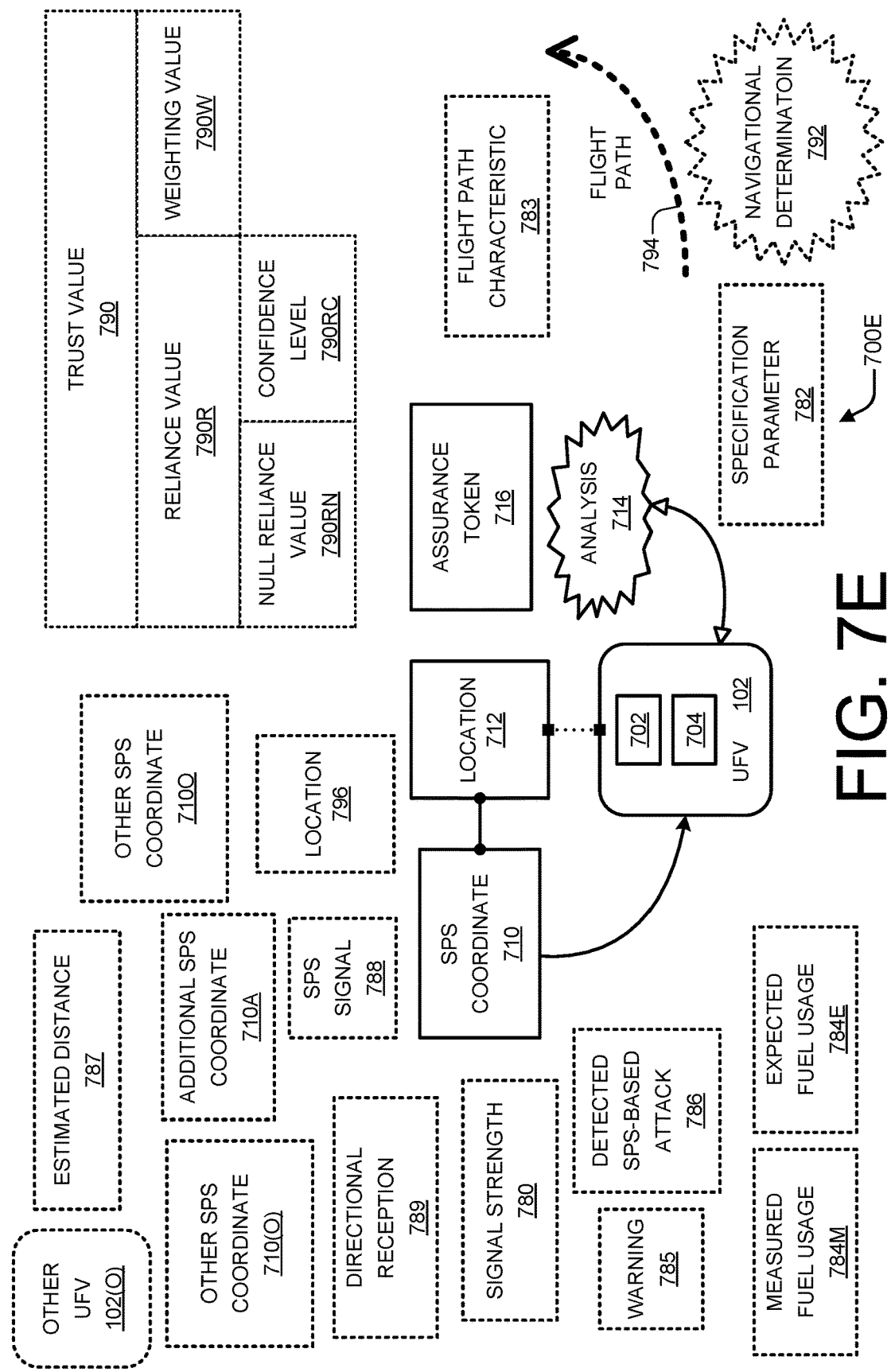

As shown in FIG. 7E, by way of example but not limitation, schematic diagram 700E may include at least one UFV 102, at least one SPS coordinate obtainment module 702, at least one assurance analysis performance module 704, at least one SPS coordinate 710, at least one location 712, at least one analysis 714, at least one assurance token 716, at least one trust value 790, at least one reliance value 790R, at least one null reliance value 790RN, at least one confidence level 790RC, at least one weighting value 790W, at least one navigational determination 792, at least one flight path 794, at least one other SPS coordinate 710O, at least one location 796, at least one signal strength 780, at least one specification parameter 782, at least one flight path characteristic 783, at least one measured fuel usage 784M, at least one expected fuel usage 784E, at least one warning 785, at least one detected SPS-based attack 786, at least one other SPS coordinate 710(O), at least one other UFV 102(O), at least one estimated distance 787, at least one additional SPS coordinate 710A, at least one SPS signal 788, or at least one directional reception 789. Additional or alternative description that may be relevant to schematic diagram 700E is provided herein below with particular reference to one or more of any of FIG. 8A-8C, 9A-9C, or 10A-10B, including but not limited to one or more of any of FIG. 9C or 10A-10B.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 8A:
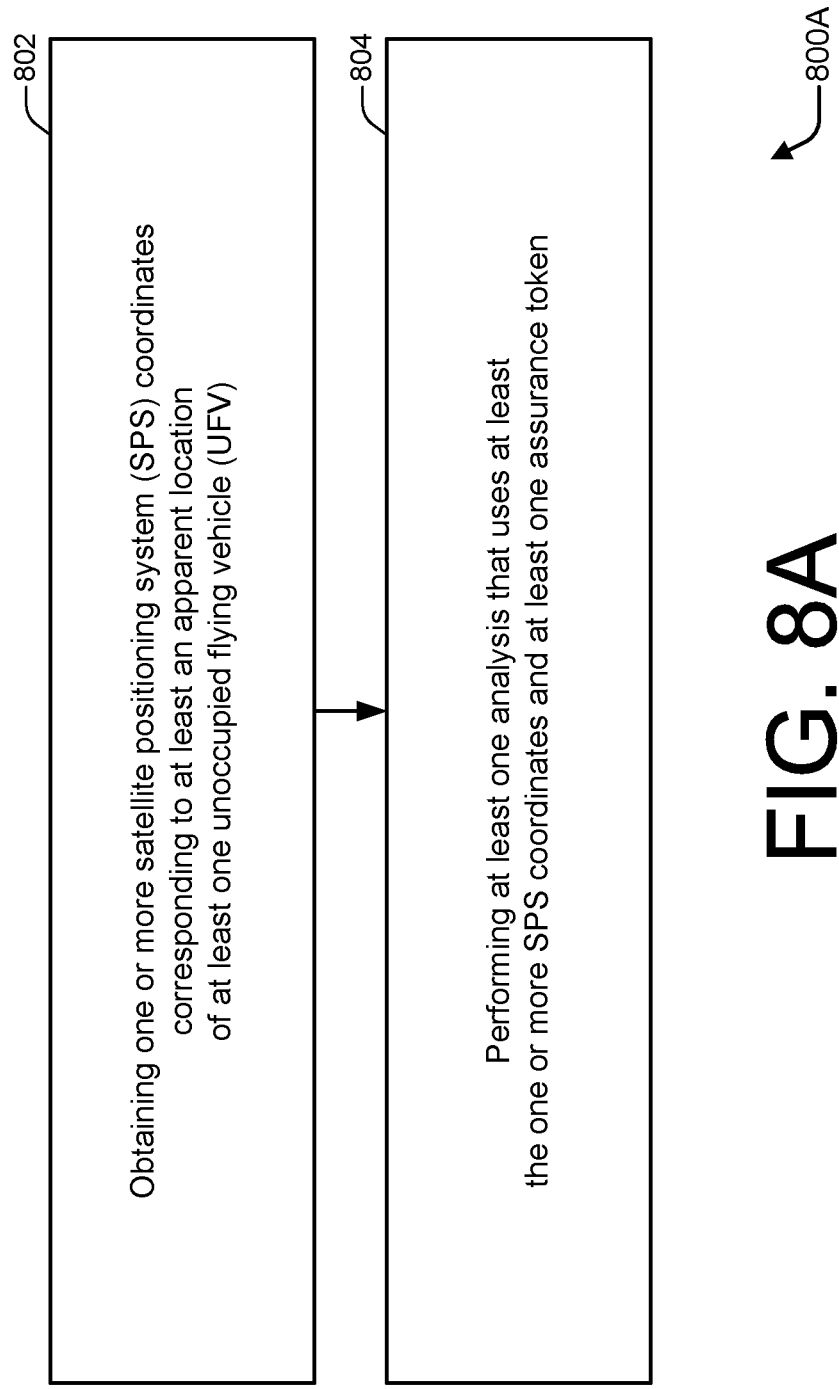
FIG. 8A is a flow diagram illustrating an example method for at least one machine with regard to unoccupied flying vehicle (UFV) location assurance in accordance with certain example embodiments.

FIG. 8A is a flow diagram 800A illustrating an example method for at least one machine with regard to unoccupied flying vehicle (UFV) location assurance in accordance with certain example embodiments. As illustrated, flow diagram 800A may include any of operations 802-804. Although operations 802-804 are shown or described in a particular order, it should be understood that methods may be performed in alternative manners without departing from claimed subject matter, including, but not limited to, with a different order or number of operations or with a different relationship between or among operations. Also, at least some operation(s) of flow diagram 800A may be performed so as to be fully or partially overlapping with other operation(s). For certain example embodiments, one or more operations of flow diagram 800A may be performed by at least one machine, such as a UFV 102 or at least a portion thereof. (Alternatively, although not explicitly illustrated, one or more operations of flow diagram 800A (or those of related flow diagrams) may be performed by at least one machine, such as a base station 306 or at least a portion thereof. With such embodiment(s), an SPS coordinate obtainment module 702 and an assurance analysis performance module 704 (e.g., of FIG. 7A) may be realized or implemented with one or more components of a base station 306 (e.g., with appropriate values, signals, parameters, coordinates, tokens, or a combination thereof, etc. being delivered to a base station 306 by a UFV 102, by at least one other UFV—such as a remote UFV 102R or another UFV 102(O), via a wireless communication, via a wired backbone communication, or a combination thereof, etc.).) However, claimed subject matter is not limited to any particular described embodiments, implementations, examples, etc.

For certain example embodiments, a method for unoccupied flying vehicle (UFV) location assurance (e.g., that includes, involves, addresses, reacts to, or a combination thereof, etc. or other otherwise handles at least one UFV 102, at least one other UFV 102(O), at least one remote UFV 102R, at least one first remote UFV 102R(1), at least one second remote UFV 102R(2), at least one POFV 302, at least one other object that may present a collision risk, at least one weather-related condition, at least one obstacle to a mission objective, at least one hindrance to accomplishing a task, at least one delay to achieving a goal, at least one location-determination-related attack, at least one location-determination-related deficiency, or a combination thereof, etc. by providing at least an increased measure of assurance that a determined (e.g., apparent) location of at least one UFV is substantially accurate (e.g., sufficiently precise or correct to enable safe completion of an assigned mission objective, within a desired or specified margin of error, within a given certainty level to enable flight path adjustments based on the determined location, or a combination thereof, etc.), which method may be at least partially implemented using hardware (e.g., circuitry, at least one processor, processor-accessible memory, at least one module, or a combination thereof, etc.) of a machine such as a UFV, may include an operation 802 or an operation 804. For certain example embodiments, an operation 802 may be directed at least partially to obtaining one or more satellite positioning system (SPS) coordinates corresponding to at least an apparent location of at least one UFV. For certain example implementations, at least one machine (e.g., a UAV) may obtain (e.g., acquire, ascertain, determine, retrieve, receive, observe via at least one sensor, demodulate by a receiver, discern via at least one analysis, compute, or a combination thereof, etc., such as via at least one obtainment 706) one or more satellite positioning system (SPS) (e.g., a system providing location-related coordinates, such as from at least one of Global Positioning System (GPS)—such as GPS I or GPS II or GPS III, Global (Orbiting) Navigation Satellite System (GLONASS), Galileo, COMPASS or Compass Navigation Satellite System (CNSS) or BeiDou-2, Beidou or BeiDou, Global Navigation Satellite System (GNSS), Indian Regional Navigational Satellite System (IRNSS), Quasi-Zenith Satellite System (QZSS), or a combination thereof, etc.) coordinates 710 (e.g., numerals, values representing a location derived using one or more SPS signals from at least one SPS system, degree/minute/second longitude or latitude values, decimal values—such as in accordance with WGS84, mixed values—such as degrees with minutes and decimal seconds, or a combination thereof, etc.) corresponding to (e.g., derived from, pertaining to, associated with, representing, related to, linked to, or a combination thereof, etc.) at least an apparent (e.g., seeming, determined but possibly unverified, ascertained via at least one procedure or component but possibly uncorroborated, potentially real, potentially faked or false, potentially as accurate as expected based on a system being employed, potentially misleading, or a combination thereof, etc.) location 712 (e.g., a geospatial position, an elevation, a position on a sphere, a position with respect to the earth, an intersection of two or more spheres—such as at least three spheres, an actual location, an apparent location, an approximate location, an estimated location, or a combination thereof, etc.) of at least one UFV 102 (e.g., a UAV, an RPV, a UCAV, a UA, an RPA, an ROA, an R/C aircraft, an AFD, a UAVS, a UAS, an sUAS, or a combination thereof, etc.). By way of example but not limitation, at least one UFV may obtain one or more SPS coordinates corresponding to at least an apparent location of at least one UFV (e.g., a UAV may ascertain at least one global positioning system (GPS) coordinate that is derived from one or more received GPS signals and processing thereof in an attempt to divine an actual position of the UAV with respect to the earth).

For certain example embodiments, an operation 804 may be directed at least partially to performing at least one analysis that uses at least the one or more SPS coordinates and at least one assurance token. For certain example implementations, at least one machine (e.g., a UAV) may perform (e.g., execute, carry out, implement, accomplish, complete, administer, or a combination thereof, etc., such as via at least one performance 708) at least one analysis 714 (e.g., an examination, an investigation, a comparison, a stochastic—such as probabilistic—evaluation, an experiment, a trial, a determination, or a combination thereof, etc.) that uses (e.g., employs, includes, factors in, considers, is based at least partly on, is responsive at least partially to, studies, or a combination thereof, etc.) at least one or more SPS coordinates 710 (e.g., one or more values that represent a position with respect to the earth and that are derived using one or more SPS signals from at least one satellite of an SPS—such as a GPS satellite) and at least one assurance token 716 (e.g., a sign, an indication, a value, evidence, a symbol, a result of a process, a representation, a series or matrix of data, or a combination thereof, etc. that provides at least a measure, an amount, a modicum, or a quantum or a combination thereof, etc. of confidence, insurance, increased likelihood, confirmation, certainty, faith, positiveness, or a combination thereof, etc. of accuracy, correctness, precision, trustworthiness, realness, authenticity, genuineness, reliability, or a combination thereof, etc.). By way of example but not limitation, at least one UFV may perform at least one analysis that uses at least one or more SPS coordinates and at least one assurance token (e.g., a UAV may compare (i) at least one coordinate acquired in accordance with GLONASS to (ii) an expected geospatial position estimated (a) with one or more values obtained via at least part of an inertial measurement unit (IMU), such as at least one acceleration value, or (b) with one or more values obtained via a history of SPS coordinates).

Figure 8B:
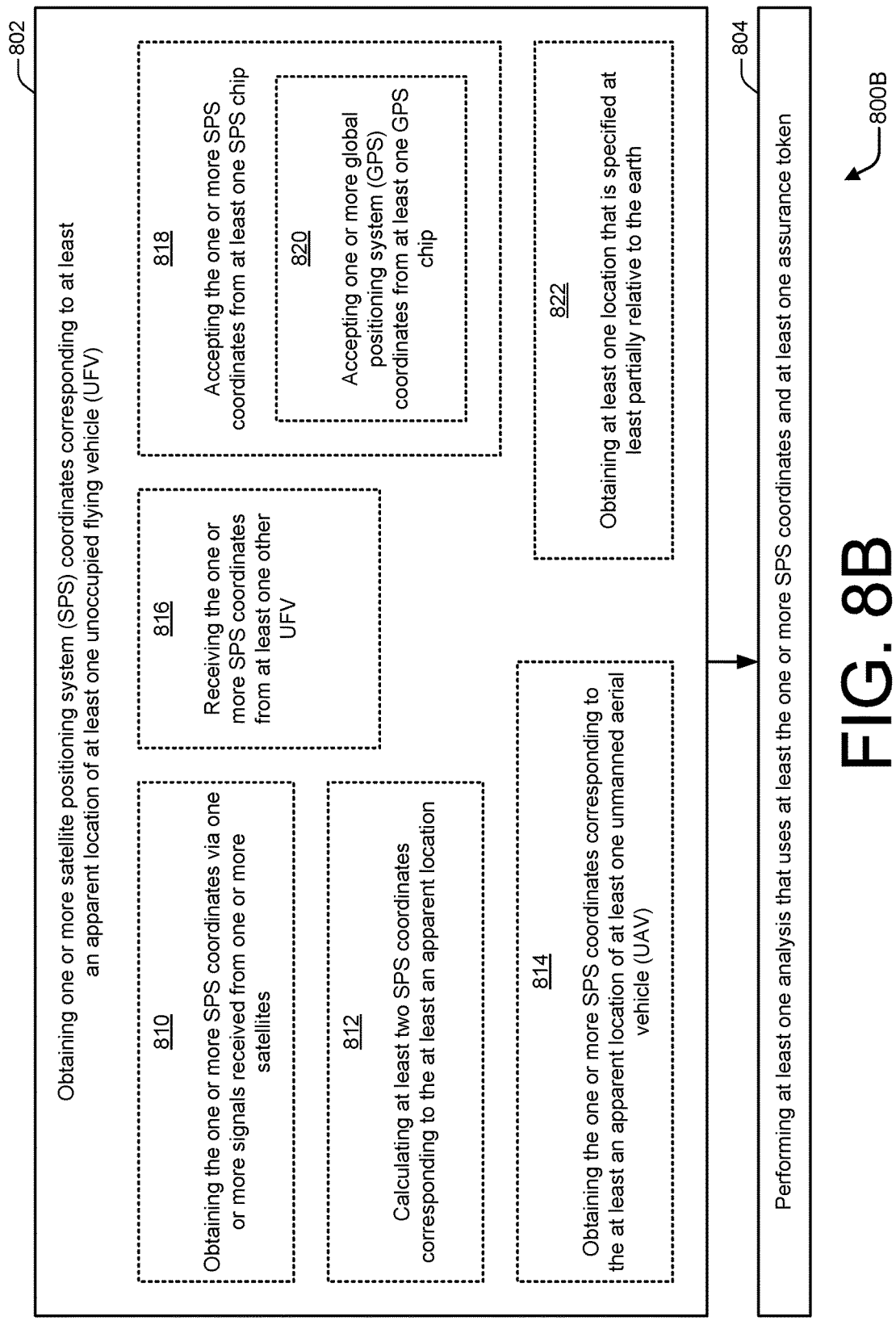
FIGS. 8B-8C depict example additions or alternatives for a flow diagram of FIG. 8A in accordance with certain example embodiments.
Figure 8C:
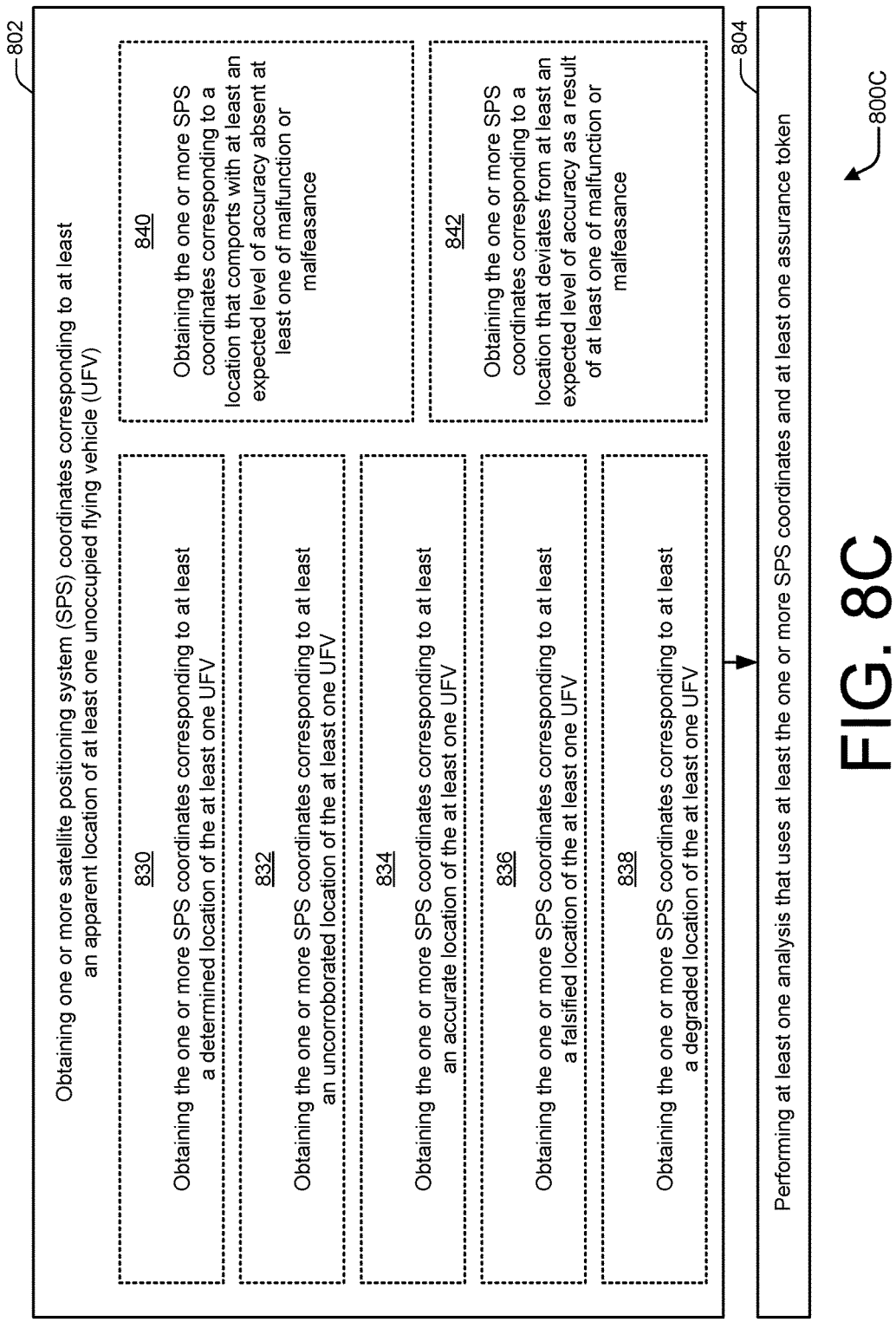

FIGS. 8B-8C depict example additions or alternatives for a flow diagram of FIG. 8A in accordance with certain example embodiments. As illustrated, flow diagrams of FIGS. 8B-8C may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 8B-8C may be performed so as to be fully or partially overlapping with other operation(s). For certain example embodiments, one or more operations of flow diagrams 800B-800C (of FIGS. 8B-8C) may be performed by at least one machine (e.g., a UFV 102 or at least a portion thereof).

FIG. 8B illustrates a flow diagram 800B having any one or more of example operations 810-822. For example, an operation 802 may include an operation 810 of obtaining the one or more SPS coordinates via one or more signals received from one or more satellites. For instance, at least one machine (e.g., a UFV 102, such as a UAV) may obtain one or more SPS coordinates 710 (e.g., a value representing a position fix attained using an SPS, such as the GPS) via (e.g., using, at least partially relying on, by processing, or a combination thereof, etc.) one or more signals 720 (e.g., detectable electromagnetic codes, radio frequency waves, timing indicators, satellite identifiers, or a combination thereof, etc.) received (e.g., decoded, demodulated, down-converted, accepted, detected, obtained from or via a communication or transmission from another, routed from an antenna or antenna element, taken into possession wirelessly, or a combination thereof, etc.) from one or more satellites 722 (e.g., an artificial body orbiting the earth, a signal-relaying or signal-generating device present above the atmosphere, a communications device in space, or a combination thereof, etc., which may pertain to one or more networks that facilitate acquiring a position, such as one related to GPS, GLONASS, Galileo, COMPASS, Beidou, IRNSS, QZSS, or a combination of such systems, etc.).

For example, an operation 802 may include an operation 812 of calculating at least two SPS coordinates corresponding to the at least an apparent location. For instance, at least one machine (e.g., a UFV 102, such as a UAV) may calculate (e.g., process data regarding timing or satellite position to acquire, determine mathematically, extract or compute using navigational equations, or a combination thereof, etc.) at least two SPS coordinates 710 (e.g., two values representing a position fix attained using an SPS, such as the GPS, that map to longitude and latitude coordinates for the earth) corresponding to at least an apparent location 712 (e.g., a position fix that is unverified, at least one coordinate that may or not be accurate, a calculated geospatial indication for a vehicle, an identified place that is not fully corroborated, or a combination thereof, etc.).

For example, an operation 802 may include an operation 814 of obtaining the one or more SPS coordinates corresponding to the at least an apparent location of at least one unmanned aerial vehicle (UAV). For instance, at least one machine (e.g., a UFV 102, such as a UAV) may obtain (e.g., ascertain) one or more SPS coordinates 710 (e.g., degree/minute/second longitude or latitude values) corresponding to at least an apparent location 712 (e.g., a position fix that is unverified, at least one coordinate that may or not be accurate, a calculated geospatial indication for a vehicle, an identified place that is not fully corroborated, or a combination thereof, etc.) of at least one unmanned aerial vehicle (UAV) 102(UAV) (e.g., a fixed wing remote or radio-controlled (RC) plane, a quad-rotor copter, a drone, or a combination thereof, etc.).

For example, an operation 802 may include an operation 816 of receiving the one or more SPS coordinates from at least one other UFV. For instance, at least one machine (e.g., a UFV 102, such as a UAV) may receive (e.g., decode, demodulate, down-convert, accept, detect, obtain from or via a communication or transmission from another, route from an antenna or antenna element, take into possession wirelessly, or a combination thereof, etc.) one or more SPS coordinates 710 (e.g., one or more values that represent a position with respect to the earth and that are derived using one or more SPS signals from at least one satellite of an SPS system—such as a GPS satellite) from at least one other UFV 102(O) (e.g., a UAV, an RPV, a UCAV, a UA, an RPA, an ROA, an R/C aircraft, an AFD, a UAVS, a UAS, an sUAS, or a combination thereof, etc. that differs from UFV 102 but may be flying proximate thereto or a determinable distance therefrom).

For example, an operation 802 may include an operation 818 of accepting the one or more SPS coordinates from at least one SPS chip. For instance, at least one machine (e.g., a UFV 102, such as a UAV) may accept (e.g., load, seize from an internal bus, acquire, attain with or without a request, or a combination thereof, etc.) one or more SPS coordinates 710 (e.g., one or more values representing a location derived using one or more SPS signals from at least one SPS system—such as Galileo) from at least one SPS chip 724 (e.g., at least one integrated circuit (IC) or package or portion thereof, an IC including or having access to an SPS antenna or an SPS receiver for an SPS—such as GLONASS, a package having a processor adapted to calculate SPS coordinates using (i) SPS signals from SPS satellites or (ii) (a) a satellite location or (b) satellite timing information, or a combination thereof, etc.).

For example, an operation 818 may include an operation 820 of accepting one or more global positioning system (GPS) coordinates from at least one GPS chip. For instance, at least one machine (e.g., a UFV 102, such as a UAV) may accept (e.g., receive a message or output signal including) one or more global positioning system (GPS) coordinates 726 (e.g., one or more values that represent a position with respect to the earth—such as at least one decimal value that may be formatted in accordance with WGS84—and that are derived using one or more GPS signals from at least one satellite of a GPS system) from at least one GPS chip 728 (e.g., at least one integrated circuit (IC) or package or portion thereof, an IC including or having access to a GPS antenna or a GPS receiver for a GPS—such as GPS I-II-III, a package having a processor adapted to calculate GPS coordinates using (i) GPS signals from GPS satellites or (ii) (a) a GPS satellite location or (b) GPS satellite timing information, or a combination thereof, etc.).

For example, an operation 802 may include an operation 822 of obtaining at least one location that is specified at least partially relative to the earth. For instance, at least one machine (e.g., a UFV 102, such as a UAV) may obtain at least one location 712 (e.g., a geospatial position, an elevation, a position on a sphere, an intersection of two or more spheres—such as at least three spheres, an actual location, an apparent location, an approximate location, an estimated location, or a combination thereof, etc.) that is specified (e.g., identified, designated, established, or a combination thereof, etc.) at least partially relative to (e.g., that is indicated with reference to, that utilizes a coordinate system having at least one point or great circle identified on, with regard to a sea level of, or a combination thereof, etc.) earth 730 (e.g., a person-populated planet, the third rock from the sun, at least partial constituent material for ground 304 (e.g., of FIGS. 3A-3C), or a combination thereof, etc.).

FIG. 8C illustrates a flow diagram 800C having any one or more of example operations 830-842. For example, an operation 802 may include an operation 830 of obtaining the one or more SPS coordinates corresponding to at least a determined location of the at least one UFV. For instance, at least one machine (e.g., a UFV 102, such as a flying drone) may obtain (e.g., ascertain) one or more SPS coordinates

710 (e.g., GPS coordinates) corresponding to at least a determined location 712Dt (e.g., a calculated location, an estimated location, an extrapolated location, an approximate location, or a combination thereof, etc.) of at least one UFV 102 (e.g., a flying drone).

For example, an operation 802 may include an operation 832 of obtaining the one or more SPS coordinates corresponding to at least an uncorroborated location of the at least one UFV. For instance, at least one machine (e.g., a UFV 102, such as a an unmanned combat air vehicle (UCAV)) may obtain (e.g., acquire) one or more SPS coordinates 710 (e.g., mixed values—such as degrees with minutes and decimal seconds) corresponding to at least an uncorroborated location 712U (e.g., an identified location that is derived from a single source of data, an estimated location that is partially but not fully corroborated, a specified location that is unverified, an approximate location that is un-finalized, or a combination thereof, etc.) of at least one UFV 102 (e.g., a UCAV).

For example, an operation 802 may include an operation 834 of obtaining the one or more SPS coordinates corresponding to at least an accurate location of the at least one UFV. For instance, at least one machine (e.g., a UFV 102, such as a remotely piloted vehicle (RPV)) may obtain (e.g., observe via at least one sensor, such as an SPS antenna, chip, module, package, or combination thereof, etc.) one or more SPS coordinates 710 (e.g., values representing a location derived using one or more SPS signals from at least one SPS) corresponding to at least an accurate location 712A (e.g., a set of values having a known error range, a position fix with an acceptable variability, a geospatial position with sufficient certainty to enable safe navigation to pursue a mission objective, or a combination thereof, etc.) of at least one UFV 102 (e.g., a RPV).

For example, an operation 802 may include an operation 836 of obtaining the one or more SPS coordinates corresponding to at least a falsified location of the at least one UFV. For instance, at least one machine (e.g., a UFV 102, such as an unmanned aircraft system (UAS)) may obtain (e.g., discern via at least one analysis) one or more SPS coordinates 710 (e.g., degree/minute/second longitude or latitude values discerned via consideration of signals received from at least one Galileo satellite) corresponding to at least a falsified location 712F (e.g., a spoofed location, a position derived from at least one faked SPS signal, an SPS coordinate injected by a hi-jacking or malware attack, or a combination thereof, etc.) of at least one UFV 102 (e.g., a UAS).

For example, an operation 802 may include an operation 838 of obtaining the one or more SPS coordinates corresponding to at least a degraded location of the at least one UFV. For instance, at least one machine (e.g., a UFV 102, such as a tilt-wing UAV) may obtain (e.g., compute based on one or more readings from at least one sensor, such as a GPS component or an inertial measurement unit (IMU)) one or more SPS coordinates 710 (e.g., a numerical value identifying a position on or above the earth) corresponding to at least a degraded location 712Dg (e.g., a location calculated using SPS signals from an inferior number of satellites; an SPS coordinate calculated from a defective SPS acquisition chain—such as an antenna, a receiver, or a processor/processor algorithm; a position fix attained using a malfunctioning satellite or a partially obscured view; a geospatial position with insufficient accuracy to navigate safely; or a combination thereof; etc.) of at least one UFV 102 (e.g., a tilt-wing UAV).

For example, an operation 802 may include an operation 840 of obtaining the one or more SPS coordinates corresponding to a location that comports with at least an expected level of accuracy absent at least one of malfunction or malfeasance. For instance, at least one machine (e.g., a UFV 102, such as a lighter-than-air (LTA) UAV) may obtain (e.g., acquire) one or more SPS coordinates 710 (e.g., one or more values that represent a position with respect to the earth and that are derived using one or more SPS signals from at least one satellite of an SPS—such as a COMPASS satellite) corresponding to a location 712 (e.g., a geospatial position) that comports with (e.g., meets, matches, agrees with, conforms to, exceeds, or a combination thereof, etc.) at least an expected (e.g., anticipated, likely, a stochastic value, specified for a given component or procedure, or a combination thereof, etc.) level of accuracy (e.g., exactness, degree of correctness, an applicable error range—such as 3-5 meters, or a combination thereof, etc.) absent (e.g., without, lacking, not being affected by, or a combination thereof, etc.) at least one of malfunction 732 (e.g., damaged, defective, internally corrupted, or a combination thereof, etc. antenna/receiving chain, processor, algorithm, or a combination thereof, etc.) or malfeasance 734 (e.g., active interference, spoofing, hijacking, externally-originating corruption, malware insertion, or a combination thereof, etc. with respect to an SPS chip, SPS signals, antenna reception, programmatic instructions, or a combination thereof, etc.).

For example, an operation 802 may include an operation 842 of obtaining the one or more SPS coordinates corresponding to a location that deviates from at least an expected level of accuracy as a result of at least one of malfunction or malfeasance. For instance, at least one machine (e.g., a UFV 102, such as a rotary wing UAV) may obtain (e.g., calculate) one or more SPS coordinates 710 (e.g., a number indicating a distance from a defined reference point or line, such as the equator or Prime Meridian, derived from at least one GLONASS satellite) corresponding to a location 712 (e.g., a position with respect to the earth) that deviates from (e.g., differs from, fails to meet, diverges or departs from, or a combination thereof, etc.) at least an expected (e.g., anticipated, likely, a stochastic value, specified for a given component or procedure, or a combination thereof, etc.) level of accuracy (e.g., exactness, degree of correctness, an applicable error range—such as 1 meter, or a combination thereof, etc.) as a result of (e.g., as a consequence of, as a product of, as caused by, or a combination thereof, etc.) at least one of malfunction 732 (e.g., damaged, defective, internally corrupted, or a combination thereof, etc. antenna/receiving chain, processor, algorithm, or a combination thereof, etc.) or malfeasance 734 (e.g., active interference, spoofing, hijacking, externally-originating corruption, malware insertion, or a combination thereof, etc. with respect to an SPS chip, SPS signals, antenna reception, programmatic instructions, or a combination thereof, etc.).

Figure 9A:
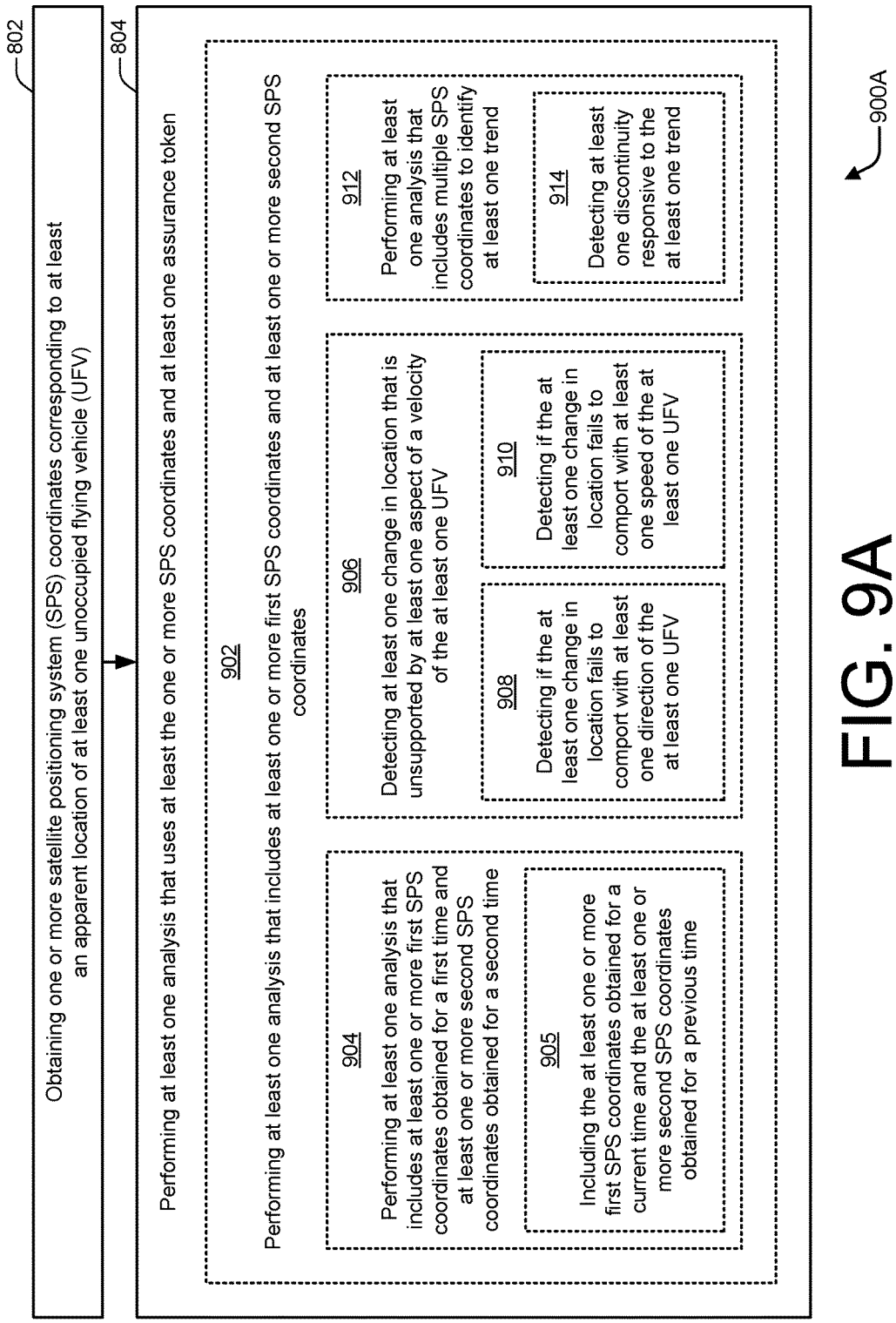

FIGS. 9A-9C depict example additions or alternatives for a flow diagram of FIG. 8A in accordance with certain example embodiments. As illustrated, flow diagrams of FIGS. 9A-9C may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 9A-9C may be performed so as to be fully or partially overlapping with other operation(s). For certain example embodiments, one or more operations of flow diagrams 900A-900C (of FIGS. 9A-9C) may be performed by at least one machine (e.g., a UFV 102 or at least a portion thereof).

FIG. 9A illustrates a flow diagram 900A having any one or more of example operations 902-914. For example, an operation 804 may include an operation 902 of performing at least one analysis that includes at least one or more first SPS coordinates and at least one or more second SPS coordinates. For instance, at least one machine (e.g., a UFV 102, such as a UAV) may perform (e.g., execute) at least one analysis 714 (e.g., investigation, mathematical manipulation, comparison, or a combination thereof, etc.) that includes at least one or more first SPS coordinates 710(1) (e.g., one or more values that represent a position with respect to the earth and that are derived using one or more SPS signals from at least one satellite of an SPS) and at least one or more second SPS coordinates 710(2) (e.g., one or more values that represent a position with respect to the earth and that are derived using one or more SPS signals from at least one satellite of an SPS (e.g., a different SPS system, a same SPS system at a different time, a same SPS system using a different SPS chip, or a combination thereof, etc.)).

For example, an operation 902 may include an operation 904 of performing at least one analysis that includes at least one or more first SPS coordinates obtained for a first time and at least one or more second SPS coordinates obtained for a second time. For instance, at least one machine (e.g., a UFV 102, such as a UAV) may perform (e.g., execute) at least one analysis 714 (e.g., examination, mathematical manipulation, comparison, or a combination thereof, etc.) that includes at least one or more first SPS coordinates 710(1) (e.g., GPS coordinates) obtained (e.g., acquired) for (e.g., at, with respect to, associated with, corresponding to when SPS signals are received, corresponding to when a calculation is performed, or a combination thereof, etc.) a first time 750(1) (e.g., one moment, current time, 5:01:35, or a combination thereof, etc.) and at least one or more second SPS coordinates 710(2) (e.g., GPS coordinates) obtained for a second time 750(2) (e.g., another moment, previous time, 5:01:25 or 4:30:00, or a combination thereof, etc.).

For example, an operation 904 may include an operation 905 of including the at least one or more first SPS coordinates obtained for a current time and the at least one or more second SPS coordinates obtained for a previous time. For instance, at least one machine (e.g., a UFV 102, such as a UAV) may include (e.g., consider as part of, factor into, input to, or a combination thereof, etc. at least one analysis) at least one or more first SPS coordinates 710(1) (e.g., position indicators from a Galileo system) obtained (e.g., calculated) for a current time (e.g., now, time of most-recent signal acquisition or coordinate calculation that has not been rejected, time of or for analysis, or a combination thereof, etc.) and at least one or more second SPS coordinates 710(2) (e.g., position indicators from a Galileo system) obtained (e.g., accepted from an on-board Galileo chip) for a previous time (e.g., past, earlier signal acquisition or coordinate calculation, prior time, or a combination thereof, etc.).

For example, an operation 902 may include an operation 906 of detecting at least one change in location that is unsupported by at least one aspect of a velocity of the at least one UFV. For instance, at least one machine (e.g., a UFV 102, such as a drone) may detect (e.g., discover, identify, divine through observation, realize as a result of at least one calculation, or a combination thereof, etc.) at least one change (e.g., difference, modification, actual or apparent movement from one to another, or a combination thereof, etc.) in location 712* (e.g., a different set of SPS coordinates) that is unsupported by (e.g., that does not match, that is not explained by, that conflicts with, or a combination thereof, etc.) at least one aspect (e.g., direction, speed, or a combination thereof, etc.) of a velocity 752 (e.g., vector, scalar value, rate of change in position, meters per second, or a combination thereof, etc.) of at least one UFV 102 (e.g., a drone).

For example, an operation 906 may include an operation 908 of detecting if the at least one change in location fails to comport with at least one direction of the at least one UFV. For instance, at least one machine (e.g., a UFV 102, such as a fixed-wing UAV) may detect (e.g., divine through observation) if at least one change (e.g., apparent differential) in location 712* (e.g., different GPS coordinates that indicate a position delta over a given timespan) fails to comport with (does not, e.g., match, be equivalent to within a determinable or acceptable level of error, agree with within an acceptable range, or a combination thereof, etc.) at least one direction 753D (e.g., angle, bearing, line pointing away, heading, 22 degrees west of north, a directional value from a compass measurement, or a combination thereof, etc.) of at least one UFV 102 (e.g., a fixed-wing UAV).

For example, an operation 906 may include an operation 910 of detecting if the at least one change in location fails to comport with at least one speed of the at least one UFV. For instance, at least one machine (e.g., a UFV 102, such as a rotary wing UAV) may detect (e.g., realize as a result of at least one calculation) if at least one change (e.g., apparent modification) in location 712* (e.g., at least one different COMPASS coordinate that indicates a position delta over a given timespan) fails to comport with (does not, e.g., match, be equivalent to within a determinable or acceptable level of error, agree with within an acceptable range, or a combination thereof, etc.) at least one speed 753S (e.g., change in position per unit of time, a speed value from an airspeed measurement, kilometers per hour, rapidity of motion or travel, or a combination thereof, etc.) of at least one UFV 102 (e.g., a rotary wing UAV).

For example, an operation 902 may include an operation 912 of performing at least one analysis that includes multiple SPS coordinates to identify at least one trend. For instance, at least one machine (e.g., a UFV 102, such as a UAV) may perform (e.g., implement) at least one analysis 714 (e.g., mathematical investigation, such as application of a filter) that includes multiple SPS coordinates 710 (e.g., GPS coordinates obtained for multiple times or multiple positions) to identify (e.g., recognize) at least one trend 754 (e.g., linear movement, parabolic movement, average speed, a smoothed path (e.g., using a filter, such as a Kalman filter), or a combination thereof, etc.).

For example, an operation 912 may include an operation 914 of detecting at least one discontinuity responsive to the at least one trend. For instance, at least one machine (e.g., a UFV 102, such as a UAV) may detect (e.g., discover) at least one discontinuity 756 (e.g., sudden change of velocity or acceleration, mathematical/graphical discontinuity, velocity discontinuity, or a combination thereof, etc.) responsive to the at least one trend 754 (e.g., smoothed path of apparent movement).

FIG. 9B illustrates a flow diagram 900B having any one or more of example operations 920-932. For example, an operation 804 may include an operation 920 of performing at least one analysis that includes at least the one or more SPS coordinates and at least one sensor value. For instance, at least one machine (e.g., a UFV 102, such as a UAV) may perform (e.g., execute) at least one analysis 714 (e.g., investigation) that includes (e.g., uses, pertains to, at least partially relies on, inputs into a process, computes with, or a combination thereof, etc.) at least one or more SPS coordinates 710 (e.g., one or more values that represent a position with respect to the earth and that are derived using one or more SPS signals from at least one satellite of an SPS) and at least one sensor value 770 (e.g., output from a sensor, voltage or current level representing a sensor reading, a number from an inertial measurement unit (IMU), a compass direction, a magnetic reading of a magnetometer, a gravitational direction, an acceleration magnitude or direction from an accelerometer, readings from a camera (e.g., optical, infrared, ultraviolet, or a combination thereof, etc.) or other image sensor, a radar sensor output, a microphone's output, readings of an airspeed sensor (e.g., a pitot tube), or a combination thereof, etc.).

For example, an operation 920 may include an operation 922 of performing at least one analysis that includes at least one inertial measurement value from at least one inertial measurement component. For instance, at least one machine (e.g., a UFV 102, such as a UAV) may perform (e.g., implement) at least one analysis 714 (e.g., comparison) that includes at least one inertial measurement value 772 (e.g., accelerometer value, gyroscopic value, a magnetic value, or a combination thereof, etc.) from at least one inertial measurement component 776 (e.g., chip, module, circuit board, sensor, or combination thereof, etc. that provides one or more inertial measurements, such as an inertial measurement unit (IMU)).

For example, an operation 922 may include an operation 924 of applying at least one accelerometer value. For instance, at least one machine (e.g., a UFV 102, such as a UAV) may apply (e.g., input, factor into, supply for computation, at least partially rely on, retrieve for inclusion in an analysis, or a combination thereof, etc.) at least one acceleration value 772A (e.g., magnitude or direction of rate of change of velocity, meters per second per second, curved trajectory, braking rate, or a combination thereof, etc., such as from at least one accelerometer).

For example, an operation 922 may include an operation 926 of applying at least one gyroscopic value. For instance, at least one machine (e.g., a UFV 102, such as a UAV) may apply (e.g., input, factor into, supply for computation, at least partially rely on, retrieve for inclusion in an analysis, or a combination thereof, etc.) at least one gyroscopic value 772G (e.g., orientation indication; rotational direction; degrees; Euler angles; a pitch, roll, or yaw value; or a combination thereof; etc., such as from at least one micro-electro-mechanical system (MEMS) gyroscope of a three-axis gyroscope mechanism).

For example, an operation 920 may include an operation 928 of performing at least one analysis that includes at least one compass value. For instance, at least one machine (e.g., a UFV 102, such as a UAV) may perform (e.g., realize) at least one analysis 714 (e.g., computation and comparison) that includes at least one compass value 774 (e.g., cardinal direction, magnetic north, approximate north, number of degrees, number of degrees with reference to a cardinal direction, or a combination thereof, etc.).

For example, an operation 920 may include an operation 930 of comparing at least one aspect of at least one velocity that is derived from the one or more SPS coordinates with at least one aspect of at least one velocity that is derived from the at least one sensor value. For instance, at least one machine (e.g., a UFV 102, such as a UAV) may compare (e.g., determine a difference, if any; examine to ascertain overlap or similarity, if any; identify which is larger or smaller, possibly by how much; detect an extent of deviation from an angle or path; apply one or more filters; or a combination thereof; etc.) at least one aspect (e.g., magnitude, direction, error range, or a combination thereof, etc.) of at least one velocity 752* (e.g., vector, scalar value, rate of change in position, meters per second, or a combination thereof, etc.) that is derived from (e.g., based at least partially on, resulting from computation including, deduced using, or a combination thereof, etc.) one or more SPS coordinates 710 (e.g., GPS coordinates) with at least one aspect (e.g., magnitude, direction, error range, or a combination thereof, etc.) of at least one velocity 752 (e.g., a potentially different vector, scalar value, rate of change in position, meters per second, or a combination thereof, etc.) that is derived from (e.g., based at least partially on, resulting from computation including, deduced using, or a combination thereof, etc.) at least one sensor value 770 (e.g., output from a sensor, voltage or current level representing a sensor reading, a number from an inertial measurement unit (IMU), a compass direction, a magnetic reading of a magnetometer, a gravitational direction, an acceleration magnitude or direction from an accelerometer, readings from a camera (e.g., optical, infrared, ultraviolet, or a combination thereof, etc.) or other image sensor, a radar sensor output, a microphone's output, readings of an airspeed sensor (e.g., a pitot tube), or a combination thereof, etc.).

For example, an operation 920 may include an operation 932 of comparing at least one position that is related to the one or more SPS coordinates with at least one position that is derived from the at least one sensor value. For instance, at least one machine (e.g., a UFV 102, such as a UAV) may compare (e.g., determine a difference, if any; examine to ascertain overlap or similarity, if any; identify which is larger or smaller, possibly by how much; detect an extent of deviation from an angle or path; apply one or more filters; or a combination thereof; etc.) at least one position 778* (e.g., geospatial point of existence, latitude or longitude values, SPS coordinates, geospatial circle or sphere of likely presence, or a combination thereof, etc.) that is related to (e.g., that is represented by, that leads to or precedes, that follows, that is indicated by, or a combination thereof, etc.) one or more SPS coordinates 710 (e.g., latitude and longitude from a GLONASS reading) with at least one position 778 (e.g., geospatial point of existence, latitude or longitude values, estimated distance or direction from a previous location extrapolated from sensor readings, geospatial circle or sphere of likely presence, or a combination thereof, etc.) that is derived from (e.g., based at least partially on, resulting from computation including, deduced using, or a combination thereof, etc.) at least one sensor value 770 (e.g., output from a sensor, voltage or current level representing a sensor reading, a number from an inertial measurement unit (IMU), a compass direction, a magnetic reading of a magnetometer, a gravitational direction, an acceleration magnitude or direction from an accelerometer, readings from a camera (e.g., optical, infrared, ultraviolet, or a combination thereof, etc.) or other image sensor, a radar sensor output, a microphone's output, readings of an airspeed sensor (e.g., a pitot tube), or a combination thereof, etc.).

FIG. 9C illustrates a flow diagram 900C having any one or more of example operations 940-956. For example, an operation 804 may include an operation 940 of performing at least one analysis that uses at least one signal strength associated with the one or more SPS coordinates. For instance, at least one machine (e.g., a UFV 102, such as a UAV) may perform (e.g., complete) at least one analysis 714 (e.g., windowed comparison) that uses (e.g., includes, considers, monitors, or a combination thereof, etc.) at least one signal strength 780 (e.g., received signal strength (RSS), or received signal strength indicator (RSSI), decibels, volts-per-meter, or a combination thereof, etc.) associated with (e.g., that corresponds to, that is linked to, that relates to, that pertains to, that is matched with, that is derived from, or a combination thereof, etc.) one or more SPS coordinates 710 (e.g., one or more values that represent a position with respect to the earth and that are derived using one or more SPS signals from at least one satellite of an SPS—such as a GPS satellite).

For example, an operation 940 may include an operation 942 of detecting if the at least one signal strength associated with the one or more SPS coordinates increases. For instance, at least one machine (e.g., a UFV 102, such as a UAV) may detect (e.g., discover, discern, determine via observation, or a combination thereof, etc.) if at least one signal strength 780 (e.g., an RSSI in dBµV/m) associated with (e.g., derived from SPS signals that correspond to) one or more SPS coordinates 710 (e.g., GPS coordinates) increases (e.g., magnitude goes up, value become higher, signal strength becomes greater with no avoidance of an obstruction between a UAV and a satellite—which may be determinable based on historical observations in a location or consulting a 3-D map of surrounding terrain or buildings, level jumps sufficiently that another source of a signal may be the cause, or a combination thereof, etc.).

For example, an operation 804 may include an operation 944 of performing at least one analysis that uses one or more specification parameters associated with the at least one UFV and at least one flight path characteristic that is determined based at least partially on the one or more SPS coordinates. For instance, at least one machine (e.g., a UFV 102, such as a rotary wing UAV) may perform (e.g., implement) at least one analysis 714 (e.g., an investigation of plausibility or possibility) that uses one or more specification parameters 782 (e.g., minimum velocity, maximum velocity, turning radius, hovering capability, maximum acceleration—including maximum deceleration, maximum altitude, maximum or minimum ascending or descending speed or rate, or a combination thereof, etc. from a manual, web page, manufacturer literature, or a combination thereof, etc. that is) associated with (e.g., corresponding to, derived from, pertaining to, related to, or a combination thereof, etc.) at least one UFV 102 (e.g., a rotary wing UAV) and at least one flight path characteristic 783 (e.g., instantaneous or average velocity, instantaneous or average acceleration, current or previous altitude, rate of change of altitude, or a combination thereof, etc.) that is determined (e.g., calculated, ascertained, interpolated, or a combination thereof, etc.) based at least partially on one or more SPS coordinates 710 (e.g., a series of latitude and longitude coordinates derived from multiple SPS signals potentially received from at least one satellite).

For example, an operation 804 may include an operation 946 of performing at least one analysis that compares a measured fuel usage to an expected fuel usage that is determined based at least partially on the one or more SPS coordinates. For instance, at least one machine (e.g., a UFV 102, such as a fixed wing UAV) may perform (e.g., execute multiple processor instructions to accomplish) at least one analysis 714 (e.g., an experiment) that compares (e.g., determines if measured fits within a range of expected) a measured fuel usage 784M (e.g., an amount of chemical, electrical, fluid, battery power, or a combination thereof, etc. that has been consumed as determined by weight, charge, flow, sensor, fuel disbursement device, or a combination thereof, etc.) to an expected fuel usage 784E (e.g., calculated, likely, typical, or a combination thereof, etc. amount or size of fuel that would be consumed to cover a given distance, including but not limited to with consideration of current flight conditions—such as wind speed) that is determined (e.g., ascertained, estimated, predicted, or a combination thereof, etc. responsive to a potential distance traveled as hypothesized) based at least partially on one or more SPS coordinates 710 (e.g., respective GPS coordinates linked to corresponding respective time stamps).

For example, an operation 804 may include an operation 948 of performing at least one analysis that uses at least the one or more SPS coordinates and at least one warning of at least one detected SPS-based attack. For instance, at least one machine (e.g., a UFV 102, such as a UAV) may perform (e.g., carry out) at least one analysis 714 (e.g., consideration of options and known parameters) that uses (e.g., employs, relies at least partially on, factors into consideration, or a combination thereof, etc.) at least one or more SPS coordinates 710 (e.g., position coordinates attained via at least one Galileo satellite) and at least one warning 785 (e.g., message, signal, announcement, broadcast transmission, or a combination thereof, etc. of a situs, type, applied strategy, direction or frequency or code used with attack, or a combination thereof, etc.—which may be received, e.g., from another UFV, a base station, a terrestrial tower, or a combination thereof, etc.) of at least one detected SPS-based attack 786 (e.g., SPS hijacking attack—such as assault to take over, to redirect, to cause to change heading, to alter destination, to confuse navigation equipment or processing, or a combination thereof, etc. via affecting an onboard SPS component or process; SPS spoofing attack—disruption to affect flight path of a UAV by mimicking, impersonating, imitating, falsifying, or a combination thereof, etc. one or more SPS signals—such as by having SPS signals present at a greater power level than those provided by SPS satellites; location-determination-based attack against using an SPS; active interference in or disruption to securing an accurate location fix with SPS signals; onslaught of spurious SPS signals; intentional hindrance to flying to a given destination using an SPS chip or process; or a combination thereof; etc.).

For example, an operation 804 may include an operation 950 of performing at least one analysis that uses at least the one or more SPS coordinates and at least one or more other SPS coordinates associated with at least one other UFV. For instance, at least one machine (e.g., a UFV 102, such as a UAV) may perform (e.g., execute) at least one analysis 714 (e.g., an examination including multiple-sourced values or one or more average values) that uses (e.g., employs, includes, depends at least partially on, or a combination thereof, etc.) at least one or more SPS coordinates 710 (e.g., one or more values that represent a position with respect to the earth and that are derived using one or more SPS signals from at least one satellite of an SPS—such as a COMPASS or Beidou satellite) and at least one or more other SPS coordinates 710(O) (e.g., latitude or longitude values obtained via one or more COMPASS or Beidou signals) associated with (e.g., corresponding to, derived from, pertaining to, linked to, related to, or a combination thereof, etc.) at least one other UFV 102(O) (e.g., another UAV that independently obtains its own SPS coordinates, which may be shared between or among other UAVs that are commonly or separately owned to double check if any of them has obtained an anomalous, including but not limited to suspicious, SPS coordinate).

For example, an operation 950 may include an operation 952 of performing the at least one analysis using at least one estimated distance between the at least one UFV and the at least one other UFV. For instance, at least one machine (e.g., a UFV 102, such as a rotary wing UAV) may perform (e.g., effectuate) at least one analysis 714 (e.g., comparison) using at least one estimated distance 787 (e.g., a mathematically-determined distance between two points—such as two sets of SPS coordinates, an approximate length of a line defined between two UFVs, a calculated space between at least two UAVs as determined by time-of-flight for one or more communications sent there between, a distance to another UAV determined via unidirectional or bidirectional radar, or a combination thereof, etc.) between at least one UFV 102 (e.g., a rotary wing UAV) and at least one other UFV 102(O) (e.g., a fixed wing or different rotary wing UAV).

For example, an operation 804 may include an operation 954 of performing at least one analysis that uses at least the one or more SPS coordinates and at least one or more additional SPS coordinates obtained from one or more SPS signals that are acquired via at least one directional reception. For instance, at least one machine (e.g., a UFV 102, such as a UAV) may perform (e.g., realize) at least one analysis 714 (e.g., comparison to determine similarity or extent of difference) that uses at least one or more SPS coordinates 710 (e.g., first pair of degree/minute/second longitude or latitude values) and at least one or more additional SPS coordinates 710A (e.g., second pair of degree/minute/second longitude or latitude values) obtained (e.g., acquired, observed via at least one sensor—such as a receiver chain, discerned via at least one calculation, or a combination thereof, etc.) from one or more SPS signals 788 (e.g., electromagnetic signal for use with SPS-based location determination, timing signal from a GLONASS satellite, identification indication from a GPS satellite, or a combination thereof, etc.) that are acquired (e.g., accepted, pulled in, retrieved, demodulated, decoded, or a combination thereof, etc.) via at least one directional reception 789 (e.g., targeted reception of electromagnetic signals, receiving one or more SPS signals using a beam formed by an antenna beamforming apparatus—including but not limited to one composed at least partially of a meta-material antenna or a phased array antenna, non-omnidirectional collection of electromagnetic waves, focusing toward at least one direction or eliminating at least one direction—such as downward or along a horizontal azimuth at a same altitude—using a mechanical or physical shield with respect to an antenna, or a combination thereof, etc.).

For example, an operation 954 may include an operation 956 of acquiring the one or more SPS signals by directing reception upward. For instance, at least one machine (e.g., a UFV 102, such as a UAV) may acquire (e.g., accept, pull in, retrieve, demodulate, decode, or a combination thereof, etc.) one or more SPS signals 788 (e.g., electromagnetic signal for use with SPS-based location determination, timing signal from a GLONASS satellite, identification indication from a GPS satellite, or a combination thereof, etc.) by directing reception upward (e.g., toward space, opposite from the earth's surface, emanating away from a dorsal or top portion of a plane or other craft, toward at least one orbiting body—such as a satellite, or a combination thereof, etc.).

Figure 10A:
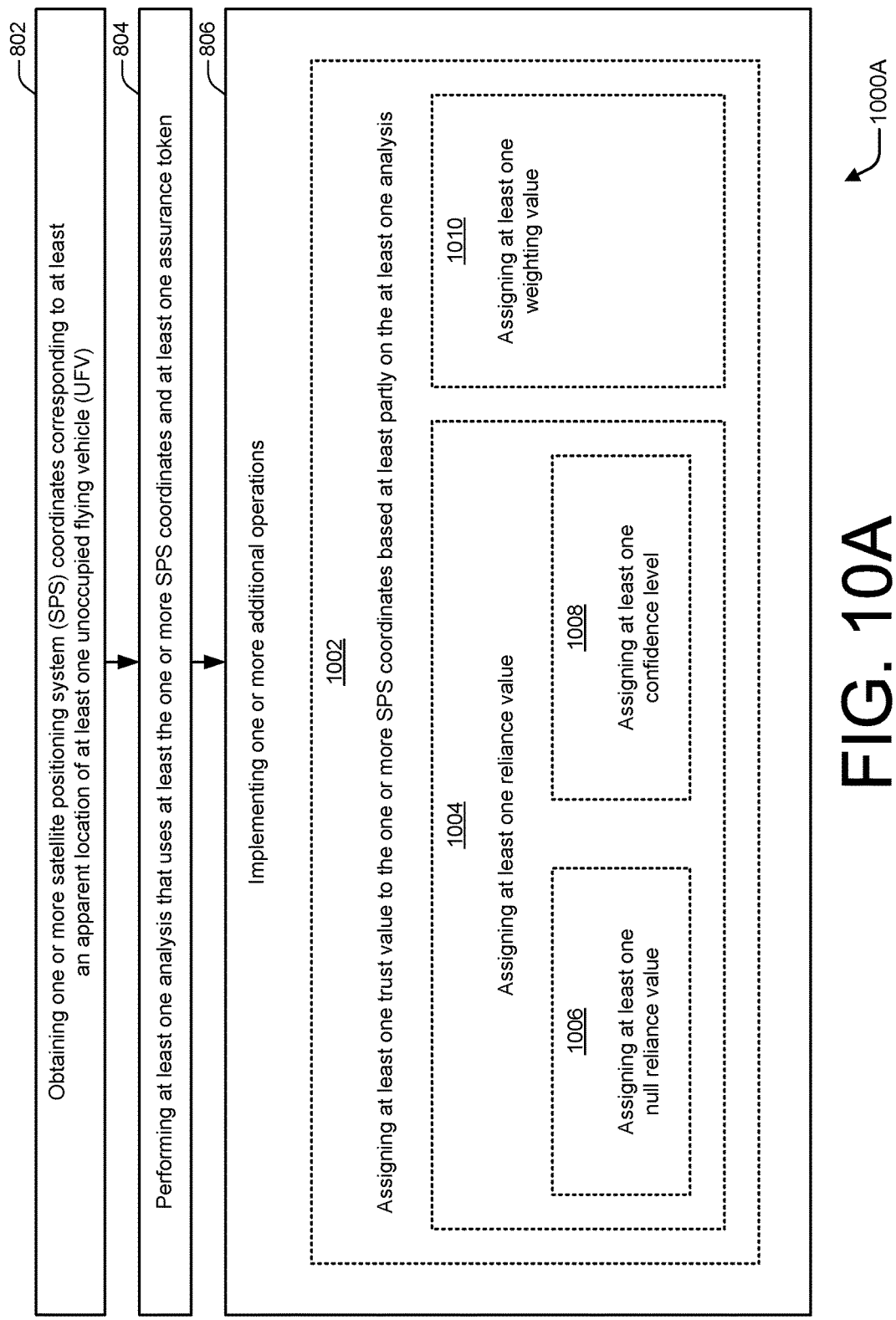
FIGS. 10A-10B depict example additions or alternatives for a flow diagram of FIG. 8A in accordance with certain example embodiments.
Figure 10B:
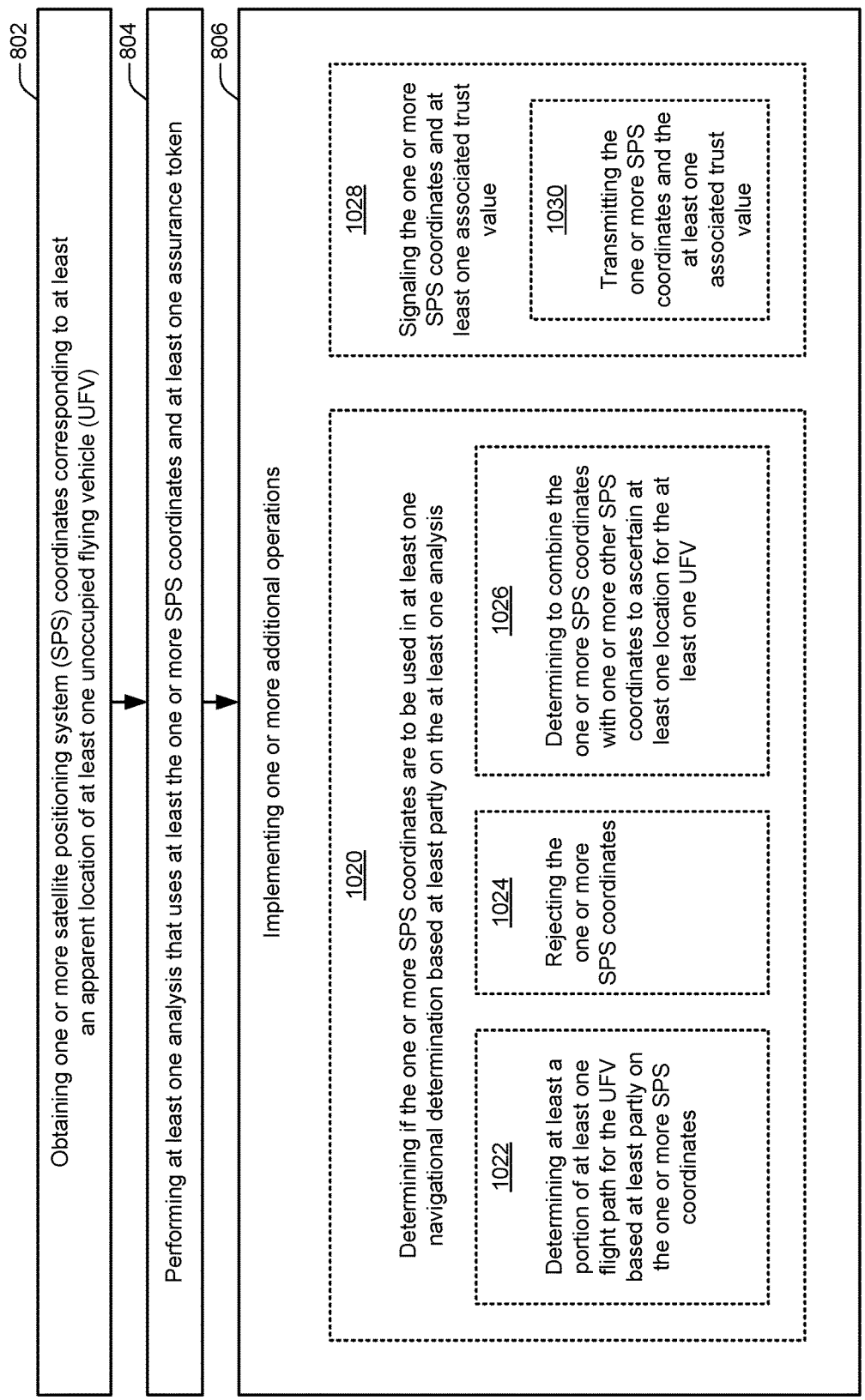

FIGS. 10A-10B depict example additions or alternatives for a flow diagram of FIG. 8A in accordance with certain example embodiments. As illustrated, flow diagrams of FIGS. 10A-10B may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Moreover, one or more of flow diagrams of FIGS. 10A-10B may illustrate implementation of one or more additional operations as represented by an operation 806 (e.g., if depicted). One or more additional operations of an operation 806 may alternatively be performed independently. Also, at least some operation(s) of flow diagrams of FIGS. 10A-10B may be performed so as to be fully or partially overlapping with other operation(s). For certain example embodiments, one or more operations of flow diagrams 1000A-1000B (of FIGS. 10A-10B) may be performed by at least one machine (e.g., a UFV 102 or at least a portion thereof).

FIG. 10A illustrates a flow diagram 1000A having any one or more of example operations 1002-1010. For example, an operation 806 may include an operation 1002 of assigning at least one trust value to the one or more SPS coordinates based at least partly on the at least one analysis. For instance, at least one machine (e.g., a UFV 102, such as a UAV) may assign (e.g., allocate, designate, associate, link, or a combination thereof, etc.) at least one trust value 790 (e.g., a numeral, a variable, a label, a category, a code, or a combination thereof, etc. that indicates at least a relative level of accuracy, reliability, precision, confidence, or a combination thereof, etc.) to one or more SPS coordinates 710 (e.g., values representing a location derived using one or more SPS signals from at least one SPS) based at least partly on at least one analysis 714 (e.g., examination, stochastic evaluation, comparison, or a combination thereof, etc.).

For example, an operation 1002 may include an operation 1004 of assigning at least one reliance value. For instance, at least one machine (e.g., a UFV 102, such as a UAV) may assign (e.g., allocate, designate, associate, link, or a combination thereof, etc.) at least one reliance value 790R (e.g., an indication of an extent to which a UFV may or should base a mission or navigational decision on an associated SPS coordinate—such as "safe", 0.85, "default to IMU guidance", "obtain new/replacement coordinate", or a combination thereof, etc.).

For example, an operation 1004 may include an operation 1006 of assigning at least one null reliance value. For instance, at least one machine (e.g., a UFV 102, such as a UAV) may assign (e.g., allocate, designate, associate, link, or a combination thereof, etc.) at least one null reliance value 790RN (e.g., an indication to reject an associated SPS coordinate, a zero or do-not-rely value, or a combination thereof, etc.).

For example, an operation 1004 may include an operation 1008 of assigning at least one confidence level. For instance, at least one machine (e.g., a UFV 102, such as a UAV) may assign (e.g., allocate, designate, associate, link, or a combination thereof, etc.) at least one confidence level 790RC (e.g., an indication of a likelihood or extent that an associated SPS coordinate is accurate—such as sufficiently accurate on which to base at least one navigational determination, an interval, an error range attached to a location estimate, or a combination thereof, etc.).

For example, an operation 1002 may include an operation 1010 of assigning at least one weighting value. For instance, at least one machine (e.g., a UFV 102, such as a UAV) may assign (e.g., allocate, designate, associate, link, or a combination thereof, etc.) at least one weighting value 790W (e.g., an indication of relative reliability between or among two or more SPS coordinates (or other location indicator), such as 34% and 66% linked to first and second SPS coordinates or 20/40/60% associated with an IMU location estimate/SPS coordinates/terrestrial-trilateration-based location approximation, respectively).

FIG. 10B illustrates a flow diagram 1000B having any one or more of example operations 1020-1030. For example, an operation 806 may include an operation 1020 of determining if the one or more SPS coordinates are to be used in at least one navigational determination based at least partly on the at least one analysis. For instance, at least one machine (e.g., a UFV 102, such as a UAV) may determine if one or more SPS coordinates 710 (e.g., one or more values that represent a position with respect to the earth and that are derived using one or more SPS signals from at least one satellite of an SPS—such as a GPS satellite) are to be used (e.g., employed, at least partially relied upon, factored into, or a combination thereof, etc.) in at least one navigational determination 792 (e.g., a decision with respect to a flight path, such as direction, timing, targeted position, or speed; a decision with respect to mission objective, such as when or how to accomplish a sensor observation or a payload delivery; or a combination thereof; etc.) based at least partly on at least one analysis 714 (e.g., examination, stochastic evaluation, comparison, or a combination thereof, etc.).

For example, an operation 1020 may include an operation 1022 of determining at least a portion of at least one flight path for the UFV based at least partly on the one or more SPS coordinates. For instance, at least one machine (e.g., a UFV 102, such as a UAV) may determine (e.g., ascertain, compute, route, or a combination thereof, etc.) at least a portion of at least one flight path 794 (e.g., a heading, a flight trajectory, a position, an altitude, a speed, a direction a velocity, an acceleration, a stability level, a destination, a course through air or space or a time at which the course is to be traversed, or a combination thereof, etc.) for UFV 102 (e.g., a UAV) based at least partly on one or more SPS coordinates 710 (e.g., GPS coordinates).

For example, an operation 1020 may include an operation 1024 of rejecting the one or more SPS coordinates. For instance, at least one machine (e.g., a UFV 102, such as a UAV) may reject (e.g., refuse, decide not to utilize, label as unreliable, or a combination thereof, etc.) one or more SPS coordinates 710 (e.g., values representing a position fix obtained via at least one GLONASS satellite).

For example, an operation 1020 may include an operation 1026 of determining to combine the one or more SPS coordinates with one or more other SPS coordinates to ascertain at least one location for the at least one UFV. For instance, at least one machine (e.g., a UFV 102, such as a UAV) may determine (e.g., decide, elect, conclude, resolve, or a combination thereof, etc.) to combine (e.g., average, weight, find a "center of gravity", interpolate, extrapolate, or a combination thereof, etc.) one or more SPS coordinates 710 (e.g., longitude or latitude values that are derived using one or more SPS signals from at least one satellite of an SPS—such as a GPS satellite) with one or more other SPS coordinates 710O (e.g., one or more values that represent a position with respect to the earth and that are derived using one or more different SPS signals from at least one satellite of an SPS—such as a Galileo satellite or a GPS satellite at a different time) to ascertain (e.g., identify, estimate, compute, or a combination thereof, etc.) at least one location 796 (e.g., a geospatial position, an elevation, a position on a sphere, a position with respect to the earth, an intersection of two or more spheres-such as at least three spheres, an actual location, an apparent location, an approximate location, an estimated location, or a combination thereof, etc.) for at least one UFV 102 (e.g., a UAV that is a drone).

For example, an operation 806 may include an operation 1028 of signaling the one or more SPS coordinates and at least one associated trust value. For instance, at least one machine (e.g., a UFV 102, such as a UAV) may signal (e.g., transmit, forward to a component over a bus, encode, modulate for a receiver chain, pass to an object, provide to a module, place on pins, or a combination thereof, etc.) one or more SPS coordinates 710 (e.g., one or more values that represent a position with respect to the earth and that are derived using one or more SPS signals from at least one satellite of an SPS—such as Beidou satellite) and at least one associated (e.g., linked, assigned, related, derived from, matched to, or a combination thereof, etc.) trust value 790 (e.g., a numeral, a variable, a label, a category, a code, or a combination thereof, etc. that indicates at least a relative level of accuracy, reliability, precision, confidence, or a combination thereof, etc.).

For example, an operation 1028 may include an operation 1030 of transmitting the one or more SPS coordinates and the at least one associated trust value. For instance, at least one machine (e.g., a UFV 102, such as a UAV) may transmit (e.g., send, communicate by wire, communicate wirelessly, frequency up-convert, modulate, encode, propagate, emanate from an emitter or antenna, or a combination thereof, etc., such as to another UFV, to a base station (e.g., a base station 306 of FIGS. 3B, 3C, and 5), to a terrestrial antenna, or a combination thereof, etc.) one or more SPS coordinates 710 (e.g., GPS coordinates) and at least one associated (e.g., linked, assigned, related, derived from, matched to, or a combination thereof, etc.) trust value 790 (e.g., a percentage value, a "questionable" label, or a combination thereof, etc.).

Those skilled in the art will appreciate that the foregoing specific exemplary processes and/or devices and/or machines and/or technologies are representative of more general processes and/or devices and/or machines and/or technologies taught elsewhere herein, such as in the claims filed herewith and/or elsewhere in the present application.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to a human reader. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail herein, these logical operations/functions are not representations of abstract ideas, but rather are representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en [dot] Wikipedia [dot] org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en [dot] Wikipedia [dot] org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood by a human reader). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of logic, such as Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en [dot] Wikipedia [dot] org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en [dot] Wikipedia [dot] org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configurations, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en [dot] Wikipedia [dot] org/wiki/Instructions_per_second (as of Jun. 5, 2012, 21:04 GMT). Thus, programs written in machine language—which may be tens of millions of machine language instructions long—are incomprehensible to most humans. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that useful, tangible, and concrete work is done. For example, as indicated above, such machine language—the compiled version of the higher-level language—functions as a technical specification which selects out hardware logic gates, specifies voltage levels, voltage transition timings, etc., such that the useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality of logic(s), or (d) virtually any combination of the foregoing. Indeed, any physical object which has a stable, measurable, and changeable state may be used to construct a machine based on the above technical description. Charles Babbage, for example, constructed the first mechanized computational apparatus out of wood, with the apparatus powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language should not be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include computer programs or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.).

Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, Verizon, AT&T, etc.), or (g) a wired/wireless services entity (e.g., Sprint, AT&T, Verizon, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user may be shown/described herein as a single illustrated figure, those skilled in the art will appreciate that a user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a"

and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for unoccupied flying vehicle (UFV) location assurance, the method being at least partially implemented by at least one machine, the method comprising:
    autonomously controlling at least one UFV including at least:
        obtaining one or more positioning system (PS) coordinates corresponding to at least an apparent location of the at least one UFV;
        analyzing at least the one or more PS coordinates including at least deriving at least one aspect of at least one velocity from the one or more PS coordinates, identifying at least one velocity trend associated with at least one time series of the derived at least one aspect of the at least one velocity, assigning at least one confidence level indicative of at least accuracy of the one of the one or more PS coordinates based at least partly on the identified at least one velocity trend, determining navigational utility of the one or more PS coordinates based at least partly on the at least one confidence level, wherein the determining navigational utility includes at least rejecting at least one PS coordinate indicated as being inaccurate in accordance with the at least one confidence level, and determining at least one portion of at least one flight path based at least partly on one or more PS coordinates determined as having navigational utility; and
    controlling the at least one UFV at least partly in accordance with the determined at least one portion of the at least one flight path.

2. An apparatus for unoccupied flying vehicle (UFV) location assurance, the apparatus comprising:
    one or more electronic devices including at least:
        circuitry configured for obtaining one or more positioning system (PS) coordinates corresponding to at least an apparent location of at least one UFV;
        circuitry configured for analyzing at least the one or more PS coordinates including at least deriving at least one aspect of at least one velocity from the one or more PS coordinates, identifying at least one velocity trend associated with at least one time series of the derived at least one aspect of the at least one velocity, assigning at least one confidence level indicative of at least accuracy of the one of the one or more PS coordinates based at least partly on the identified at least one velocity trend, determining navigational utility of the one or more PS coordinates based at least partly on the at least one confidence level, wherein the determining navigational utility includes at least rejecting at least one PS coordinate indicated as being inaccurate in accordance with the at least one confidence level, and determining at least one portion of at least one flight path based at least partly on one or more PS coordinates determined as having navigational utility; and
        circuitry configured for controlling the at least one UFV at least partly in accordance with the determined at least one portion of the at least one flight path.

3. The apparatus of claim 2, wherein the circuitry configured for obtaining one or more positioning system (PS) coordinates corresponding to at least an apparent location of at least one UFV comprises:
    circuitry configured for obtaining the one or more PS coordinates via one or more signals received from one or more positioning systems satellites.

4. The apparatus of claim 2, wherein the circuitry configured for obtaining one or more positioning system (PS) coordinates corresponding to at least an apparent location of at least one UFV comprises:
    circuitry configured for calculating at least two PS coordinates corresponding to the at least an apparent location.

5. The apparatus of claim 2, wherein the circuitry configured for obtaining one or more positioning system (PS) coordinates corresponding to at least an apparent location of at least one UFV comprises:

at least one of:
  circuitry configured for obtaining the one or more PS coordinates corresponding to the at least an apparent location of at least one unmanned aerial vehicle (UAV); or
  circuitry configured for receiving the one or more PS coordinates from at least one other UFV.

6. The apparatus of claim 2, wherein the circuitry configured for obtaining one or more positioning system (PS) coordinates corresponding to at least an apparent location of at least one UFV comprises:
at least one of:
  circuitry configured for accepting the one or more PS coordinates from at least one PS chip; or
  circuitry configured for accepting one or more global positioning system (GPS) coordinates from at least one GPS chip.

7. The apparatus of claim 2, wherein the circuitry configured for obtaining one or more positioning system (PS) coordinates corresponding to at least an apparent location of at least one UFV comprises:
  circuitry configured for obtaining at least one location that is specified at least partially relative to the earth.

8. The apparatus of claim 2, wherein the circuitry configured for obtaining one or more positioning system (PS) coordinates corresponding to at least an apparent location of at least one UFV comprises:
  circuitry configured for obtaining the one or more PS coordinates corresponding to at least a determined location of the at least one UFV.

9. The apparatus of claim 2, wherein the circuitry configured for obtaining one or more positioning system (PS) coordinates corresponding to at least an apparent location of at least one UFV comprises:
  circuitry configured for obtaining the one or more PS coordinates corresponding to at least an uncorroborated location of the at least one UFV.

10. The apparatus of claim 2, wherein the circuitry configured for obtaining one or more positioning system (PS) coordinates corresponding to at least an apparent location of at least one UFV comprises:
  circuitry configured for obtaining the one or more PS coordinates corresponding to at least an accurate location of the at least one UFV.

11. The apparatus of claim 2, wherein the circuitry configured for obtaining one or more positioning system (PS) coordinates corresponding to at least an apparent location of at least one UFV comprises:
  circuitry configured for obtaining the one or more PS coordinates corresponding to at least a falsified location of the at least one UFV.

12. The apparatus of claim 2, wherein the circuitry configured for obtaining one or more positioning system (PS) coordinates corresponding to at least an apparent location of at least one UFV comprises:
  circuitry configured for obtaining the one or more PS coordinates corresponding to at least a degraded location of the at least one UFV.

13. The apparatus of claim 2, wherein the circuitry configured for obtaining one or more positioning system (PS) coordinates corresponding to at least an apparent location of at least one UFV comprises:
at least one of:
  circuitry configured for obtaining the one or more PS coordinates corresponding to a location that comports with at least an expected level of accuracy absent at least one of malfunction or malfeasance; or
  circuitry configured for obtaining the one or more PS coordinates corresponding to a location that deviates from at least an expected level of accuracy as a result of at least one of malfunction or malfeasance.

14. The apparatus of claim 2, wherein the circuitry configured for automatically analyzing at least one or more first PS coordinates and at least one or more second PS coordinates comprises:
  circuitry configured for automatically analyzing at least one or more first PS coordinates and at least one or more second PS coordinates.

15. The apparatus of claim 14, wherein the circuitry configured for automatically analyzing at least one or more first PS coordinates and at least one or more second PS coordinates comprises:
  circuitry configured for automatically analyzing at least one or more first PS coordinates obtained for a first time and at least one or more second PS coordinates obtained for a second time.

16. The apparatus of claim 15, wherein the circuitry configured for automatically analyzing at least one or more first PS coordinates obtained for a first time and at least one or more second PS coordinates obtained for a second time comprises:
  circuitry configured for automatically analyzing the at least one or more first PS coordinates obtained for a current time and the at least one or more second PS coordinates obtained for a previous time.

17. The apparatus of claim 2, wherein the circuitry configured for analyzing at least the one or more PS coordinates comprises:
  circuitry configured for filtering at least one time series of the derived at least one aspect of the at least one velocity to form a smoothed path identifying at least one velocity trend, detecting at least one discontinuity indicative of at least one mathematical discontinuity in the smoothed path identifying the at least one velocity trend, assigning at least one confidence level indicative of at least accuracy of the one of the one or more PS coordinates based at least partly on the identified at least one velocity trend, determining navigational utility of the one or more PS coordinates based at least partly on the at least one confidence level, wherein the determining navigational utility includes at least rejecting at least one PS coordinate indicated as being inaccurate in accordance with the at least one confidence level, and determining at least one portion of at least one flight path based at least partly on one or more PS coordinates determined as having navigational utility.

18. The apparatus of claim 2, wherein the circuitry configured for controlling the at least one UFV comprises:
at least one of:
  circuitry configured for controlling at least one velocity associated with the at least one UFV at least partly in accordance with the determined at least one portion of the at least one flight path; or
  circuitry configured for controlling at least one of a heading, a flight trajectory, a position, an altitude, a speed, a direction, an acceleration, a stability level, a destination, or a course through air or space or a time at which the course is to be traversed associated with the at least one UFV at least partly in accordance with the determined at least one portion of the at least one flight path.

19. The apparatus of claim 2, wherein the circuitry configured for analyzing at least the one or more PS coordinates comprises:

circuitry configured for analyzing at least the one or more PS coordinates including at least detecting at least one discontinuity indicative of at least one sudden change in the at least one velocity trend, assigning at least one confidence level indicative of at least accuracy of the one of the one or more PS coordinates based at least partly on detection of the at least one discontinuity, and determining navigational utility of the one or more PS coordinates based at least partly on the at least one confidence level, wherein the determining navigational utility includes at least rejecting at least one PS coordinate indicated as being inaccurate in accordance with the at least one confidence level.

20. A system for unoccupied flying vehicle (UFV) location assurance, the system comprising:

means for analyzing at least one or more PS coordinates obtaining one or more positioning system (PS) coordinates corresponding to at least an apparent location of at least one UFV;

means for including at least deriving at least one aspect of at least one velocity from the one or more PS coordinates, identifying at least one velocity trend associated with at least one time series of the derived at least one aspect of the at least one velocity, assigning at least one confidence level indicative of at least accuracy of the one of the one or more PS coordinates based at least partly on the identified at least one velocity trend, determining navigational utility of the one or more PS coordinates based at least partly on the at least one confidence level, wherein the determining navigational utility includes at least rejecting at least one PS coordinate indicated as being inaccurate in accordance with the at least one confidence level, and determining at least one portion of at least one flight path based at least partly on one or more PS coordinates determined as having navigational utility; and means for controlling the at least one UFV at least partly in accordance with the determined at least one portion of the at least one flight path.

\* \* \* \* \*

UNITED STATES PATENT AND TRADEMARK OFFICE
CERTIFICATE OF CORRECTION

PATENT NO. : 10,429,514 B2  
APPLICATION NO. : 15/730629  
DATED : October 1, 2019  
INVENTOR(S) : Royce A. Levien et al.

Page 1 of 1

It is certified that error appears in the above-identified patent and that said Letters Patent is hereby corrected as shown below:

In the Claims

Please replace Claim 20, Column 53, Lines 17 through Column 54, Line 1 with the language below:
--20. A system for unoccupied flying vehicle (UFV) location assurance, the system comprising:
means for obtaining one or more positioning system (PS) coordinates corresponding to at least an apparent location of at least one UFV;
means for analyzing at least the one or more PS coordinates including at least--

Signed and Sealed this
Twelfth Day of November, 2019

Andrei Iancu
*Director of the United States Patent and Trademark Office*